(12) United States Patent
Mochizuki et al.

(10) Patent No.: US 9,776,567 B2
(45) Date of Patent: Oct. 3, 2017

(54) DISPLAY CONTROL DEVICE, DISPLAY DEVICE, DISPLAY CONTROL METHOD, AND NON-TRANSITORY STORAGE MEDIUM

(71) Applicant: Panasonic Intellectual Property Management Co., Ltd., Osaka (JP)

(72) Inventors: Makoto Mochizuki, Kanagawa (JP); Koichi Emura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 339 days.

(21) Appl. No.: 14/626,721

(22) Filed: Feb. 19, 2015

(65) Prior Publication Data

US 2015/0251600 A1 Sep. 10, 2015

(30) Foreign Application Priority Data

Mar. 6, 2014 (JP) ................................ 2014-043769
Nov. 19, 2014 (JP) ................................ 2014-234984

(51) Int. Cl.
*B60R 1/00* (2006.01)
*G06T 11/20* (2006.01)
(Continued)

(52) U.S. Cl.
CPC ................ *B60R 1/001* (2013.01); *B60R 1/00* (2013.01); *G02B 27/01* (2013.01);
(Continued)

(58) Field of Classification Search
CPC ............ B60R 1/001; B60R 2300/9033; B60R 2300/8093; B60R 2300/70; G09G 3/002; G02B 27/01
See application file for complete search history.

(56) References Cited

U.S. PATENT DOCUMENTS 4,618,948 A * 10/1986 Sakakibara ............. G01S 7/521
340/904
6,128,576 A 10/2000 Nishimoto et al.
(Continued)

FOREIGN PATENT DOCUMENTS

JP 2000-028717 1/2000
JP 2009-117978 5/2009
(Continued)

OTHER PUBLICATIONS

The Extended European Search Report dated Jun. 9, 2016 for the related European Patent Application No. 15155535.6.
(Continued)

*Primary Examiner* — Ariel Balaoing
(74) *Attorney, Agent, or Firm* — Greenblum & Bernstein, P.L.C.

(57) ABSTRACT

A display control device includes an obtainer and a controller. The obtainer obtains a detection accuracy of an object that exists in surroundings of a movable body. When the obtainer obtains a first detection accuracy, the controller controls an image generator so as to generate a first predetermined image that shows a first graphic having a predetermined shape and divided into n regions (n is an integer greater than or equal to 2). When the obtainer obtains a second detection accuracy that is lower than the first detection accuracy, the controller controls the image generator so as to generate a second predetermined image that shows a second graphic having a predetermined shape and undivided or divided into m regions (m is an integer that is greater than or equal to 1 and that is smaller than n).

20 Claims, 25 Drawing Sheets

(51) Int. Cl.
*G02B 27/01* (2006.01)
*G09G 3/00* (2006.01)
*G06K 9/00* (2006.01)
*G08G 1/16* (2006.01)

(52) U.S. Cl.
CPC ........ *G06K 9/00805* (2013.01); *G06T 11/203* (2013.01); *G06T 11/206* (2013.01); *G08G 1/165* (2013.01); *G08G 1/166* (2013.01); *G08G 1/167* (2013.01); *G09G 3/002* (2013.01); *B60R 2300/205* (2013.01); *B60R 2300/70* (2013.01); *B60R 2300/8033* (2013.01); *B60R 2300/8093* (2013.01); *G02B 2027/0196* (2013.01)

(56) References Cited

U.S. PATENT DOCUMENTS

| | | | |
|---|---|---|---|
| 2005/0276447 A1* | 12/2005 | Taniguchi | G06K 9/00362 382/103 |
| 2009/0316956 A1 | 12/2009 | Higuchi et al. | |
| 2010/0020170 A1* | 1/2010 | Higgins-Luthman | B60Q 1/1423 348/135 |
| 2010/0208075 A1 | 8/2010 | Katsuno | |
| 2011/0098892 A1* | 4/2011 | Lundmark | B60R 21/0134 701/45 |
| 2012/0300077 A1* | 11/2012 | Ikeda | B60R 1/00 348/148 |

FOREIGN PATENT DOCUMENTS

| | | |
|---|---|---|
| JP | 2010-003254 | 1/2010 |
| JP | 2011-039611 | 2/2011 |
| JP | 2011-043405 | 3/2011 |
| JP | 2011-175485 | 9/2011 |
| JP | 2013-187883 | 9/2013 |

OTHER PUBLICATIONS

Ken Brodlie et al: "A Review of Uncertainty in Data Visualization" In: "Expanding the Frontiers of Visual Analytics and Visualization", Jan. 2012, (Jan. 2012), Springer London, London, XP055272746.

\* cited by examiner

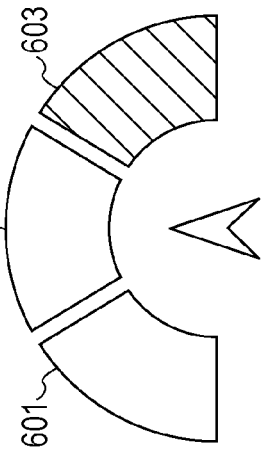
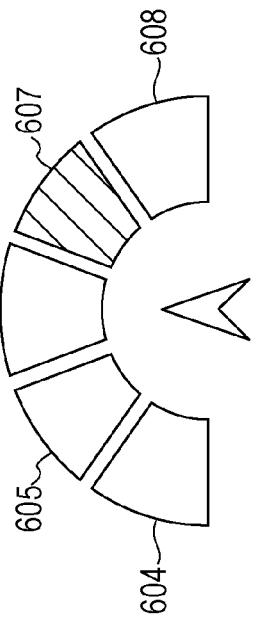
FIG. 7A
| CONDITION [ANGLE] | HIGHLIGHTED REGION |
|---|---|
| A < -90 | NOT DISPLAYED |
| -90 ≤ A < -30 | REGION 601 |
| -30 ≤ A < 30 | REGION 602 |
| 30 ≤ A < 90 | REGION 603 |
| 90 ≤ A | NOT DISPLAYED |
FIG. 7C
| CONDITION [ANGLE] | HIGHLIGHTED REGION |
|---|---|
| A < -90 | NOT DISPLAYED |
| -90 ≤ A < -60 | REGION 604 |
| -60 ≤ A < -30 | REGION 605 |
| -30 ≤ A < 30 | REGION 606 |
| 30 ≤ A < 60 | REGION 607 |
| 60 ≤ A < 90 | REGION 608 |
| 90 ≤ A | NOT DISPLAYED |

FIG. 8A
| CONDITION [DISTANCE] | HIGHLIGHTED REGION |
|---|---|
| 0 ≤ D < 50 | REGION 701 |
| 50 ≤ D | REGION 702 |
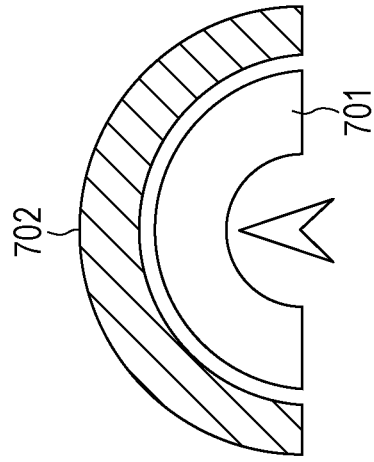
FIG. 8B
FIG. 8C
| CONDITION [DISTANCE] | HIGHLIGHTED REGION |
|---|---|
| 0 ≤ D < 30 | REGION 703 |
| 30 ≤ D < 60 | REGION 704 |
| 60 ≤ D | REGION 705 |
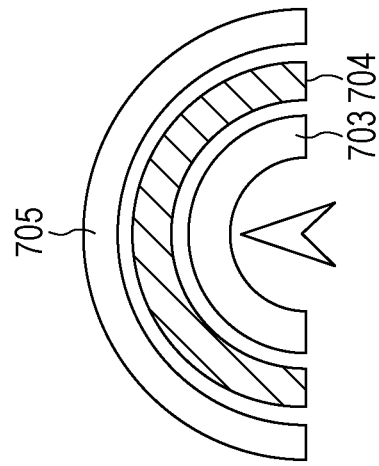
FIG. 8D FIG. 18A
FIG. 18B

FIG. 18C

DISPLAY CONTROL DEVICE, DISPLAY DEVICE, DISPLAY CONTROL METHOD, AND NON-TRANSITORY STORAGE MEDIUM

BACKGROUND

1. Technical Field

The present disclosure relates to a display control device and a display control method that control display of information provided to an occupant in a vehicle or the like and to a display device and a non-transitory storage medium.

2. Description of the Related Art

Recent years have seen active development of a driving assistance system that detects an object (e.g., a vehicle, a pedestrian, a white line, a road sign, or the like) that exists in the surroundings of a vehicle by using a sensor mounted thereon and that presents information to an occupant in the vehicle upon determining that the possibility of collision with the object is high.

In an environment where the vehicle travels, however, there are cases in which the accuracy with which the sensor detects an object in the surroundings of the vehicle changes (this accuracy is hereinafter referred to as "sensing accuracy"). One example of a method for changing information presentation to the occupant in accordance with the sensing accuracy is a technology disclosed in Japanese Unexamined Patent Application Publication No. 2009-117978 (hereinafter referred to as "related art").

In the related art, during display of an image captured by a vehicle-mounted camera, an object included in the image is highlighted according to the degree of reliability of recognition accuracy of the object. This makes it possible to avoid giving the occupant a sense of discomfort due to an event in which information being displayed is suddenly not displayed when the sensing accuracy decreases.

However, although, in the related art, an object is highlighted according to the sensing accuracy, no consideration is given to the sensing accuracy.

SUMMARY

One non-limiting and exemplary embodiment provides a display control device and a display control method that allow an occupant in a movable body to intuitively recognize the sensing accuracy and also provides a display device and a non-transitory storage medium.

In one general aspect, the techniques disclosed here feature a display control device in a display system including a detection device that detects a predetermined object that exists in surroundings of a movable body, a calculator that calculates a detection accuracy of the detection device, an image generator that generates a predetermined image, and a displayer that outputs the predetermined image on a display medium to display a graphic having a predetermined shape on the display medium. The display control device includes: an obtainer that obtains the detection accuracy; and a controller that controls, based on the detection accuracy, the image generator so as to generate the predetermined image that shows the graphic having a predetermined shape when displayed on the display medium. The controller controls the image generator so as to generate a first predetermined image as the predetermined image, when the obtainer obtains a first detection accuracy, and controls the image generator so as to generate a second predetermined image as the predetermined image, when the obtainer obtains a second detection accuracy lower than the first detection accuracy. The first predetermined image shows, as the graphic having a predetermined shape, a first graphic divided into n regions when displayed on the display medium, and the second predetermined image shows, as the graphic having a predetermined shape, a second graphic divided into m regions or undivided when displayed on the display medium, where n is an integer greater than or equal to 2, and m is an integer that is greater than or equal to 1 and that is smaller than n.

According to the present disclosure, an occupant in a movable body can intuitively and visually recognize the sensing accuracy.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 7A to 7D illustrate examples of a table and highlighting according to the first embodiment of the present disclosure;

FIGS. 8A to 8D illustrate examples of a table and highlighting according to the first embodiment of the present disclosure;

FIGS. 18A to 18C illustrate examples of dividing the image according to the first embodiment of the present disclosure;

DETAILED DESCRIPTION

In known driving assistance systems, for example, when a camera is used as a sensor, the sensing accuracy may decrease in driving environments, such as at night, in backlight, and in rainy weather. In known driving assistance systems, for example, when a millimeter-wave radar is used as a sensor, the sensing accuracy may also decrease in driving environments where an obstruction that reflects radar waves exists. If information presentation that is the same as typical information presentation is performed for the occupant in spite of the situation in which the sensing accuracy has decreased, there is the possibility that an erroneous warning is issued or no warning is issued. Thus, it is important for the occupant to recognize the decrease in the sensing accuracy. Accordingly, embodiments of the present disclosure allow the occupant to recognize the sensing accuracy.

First Embodiment

A first embodiment of the present disclosure will be described with reference to the accompanying drawings.

Figure 1:
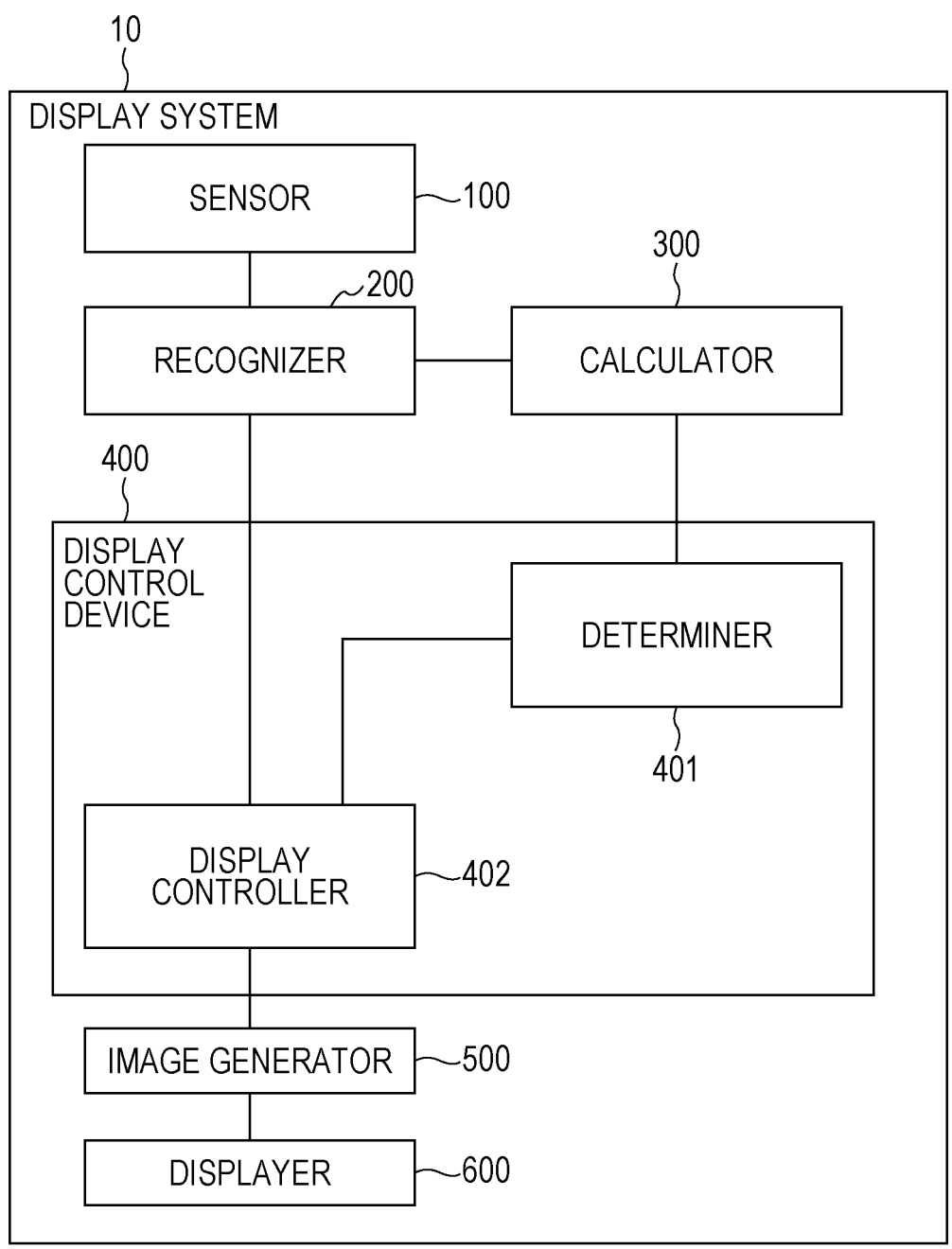
FIG. 1 is a block diagram illustrating an example configuration of a display system according to a first embodiment of the present disclosure.

First, a description will be given of an example configuration of a display system 10 according to the present embodiment. FIG. 1 is a block diagram illustrating an example configuration of the display system 10 according to the present embodiment.

The display system 10 is used, for example, in a movable body, such as a vehicle. That is, the display system 10 may be vehicle-mounted equipment or may be equipment that is carried into a vehicle. Although a description in the present embodiment will be given assuming that the display system 10 is applied to a vehicle, the movable body is not limited to a vehicle and may be a ship, an airplane, or the like. Although a description in the present embodiment will be given of an example in which a user is an occupant in a vehicle, particularly the driver of a vehicle, the user is not limited thereto. In addition, the display system 10 may also be used for a wearable computer (e.g., an HMD described below) that a user can wear on his or her body.

In FIG. 1, the display system 10 includes a sensor 100, a recognizer 200, a calculator 300, a display control device 400, an image generator 500, and a displayer 600. The display control device 400 has a determiner 401 and a display controller 402.

Figure 17:
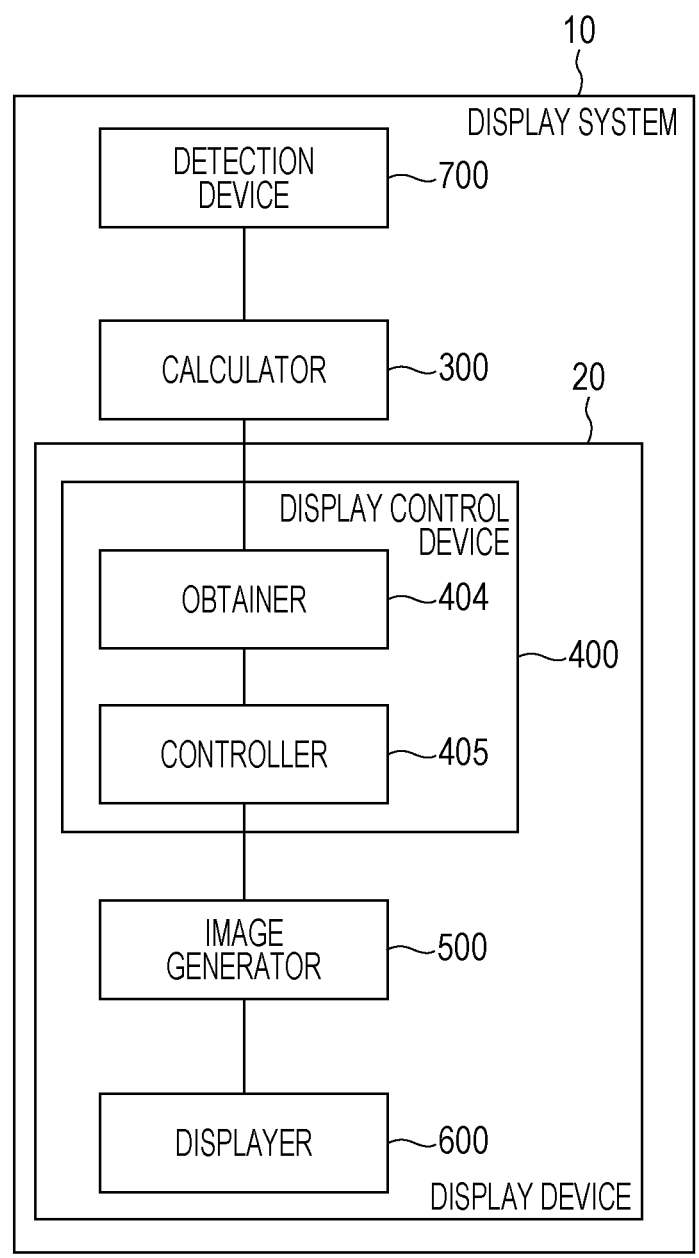
FIG. 17 is a block diagram illustrating another example configuration of the display system according to the first embodiment of the present disclosure.
Figure 19:
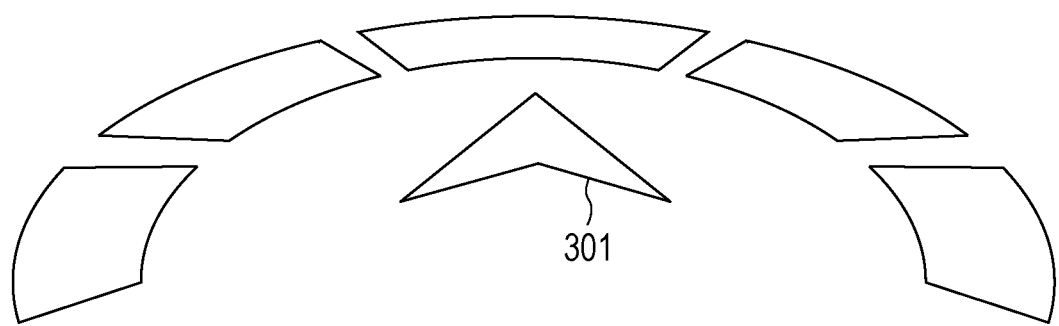
FIG. 19 illustrates an example of dividing the image according to the first embodiment of the present disclosure.

The sensor 100 may also be included in a detection device (see FIG. 17). The recognizer 200 may also be included in the detection device (see FIG. 17) in conjunction with the sensor 100. The display control device 400 may also include an obtainer (see FIG. 17). Examples of the obtainer include an input terminal, a connector and a signal input unit. The determiner 401 and the display controller 402 may also be combined together to serve as a controller (see FIG. 17).

FIG. 17 illustrates another example configuration of the display system 10. This display system 10 includes a detection device 700, a calculator 300, a display control device 400, an image generator 500, and a displayer 600. The display control device 400 has an obtainer 404 and a controller 405. A display device 20 has the display control device 400, the image generator 500, and the displayer 600. Details of the display system 10 illustrated in FIG. 17 are described later.

The constituent elements of the display system 10 will be described below with reference to FIG. 1.

The sensor 100 senses the forward view of the driver of the vehicle at predetermined time intervals. The sensor 100 is, for example, a sensing camera. The sensing camera is installed inside or outside the vehicle to capture an image of the forward view of the vehicle. In addition, the sensing camera may capture not only an image of the forward view but also images of the side views. Alternatively, the sensor 100 may be, for example, a radar. The radar is installed inside or outside the vehicle to sense the forward view and so on of the vehicle. The forward view and so on of the vehicle may hereinafter be referred to as "surroundings of the vehicle".

The sensor 100 outputs surroundings information indicating a result of the surroundings sensing to the recognizer 200. This outputting is performed, for example, at predetermined time intervals.

On the basis of the surroundings information from the sensor 100, the recognizer 200 recognizes a predetermined object that exists in the surroundings of the vehicle. Examples of the object include a movable body (e.g., a vehicle, a human, a bicycle, or a two-wheeled vehicle), a white line on a road, a sign, a road surface marking, a curb, a guardrail, a traffic light, a utility pole, and a building. For example, when the sensor 100 is a sensing camera, the recognizer 200 performs pattern matching or the like on the surroundings information (a surroundings image) to recognize an object. Also, for example, when the sensor 100 is a radar, the recognizer 200 extracts an object from the surroundings information through clustering, machine learning, or the like to recognize an object. Since the object recognition technology for the recognizer 200 is also known art, a detailed description thereof is not given herein.

The recognizer 200 outputs recognition result information indicating a recognition result of the object to the calculator 300 and the display controller 402 in the display control device 400. The recognition result information includes, for example, the position (X, Y) where an object exists, the angle of an object relative to the traveling direction of the vehicle (this angle is hereinafter referred to simply as a "relative angle"), the speed of the vehicle relative to an object (this speed is hereinafter referred to simply as a "relative speed"), an object type, information obtained by pattern matching, and information obtained by object tracking processing. The position (X, Y) where an object exists represents coordinates in a camera coordinate system in which X indicates a horizontal direction, and Y indicates a forward direction, with reference to the point where the sensing camera of the vehicle is installed. Y of the position (X, Y) where an object exists also indicates the distance between the vehicle and the object in the vehicle traveling direction (this distance is hereinafter referred to simply as "distance").

The calculator 300 calculates a recognition accuracy of the sensor (which may also be referred to as "sensing accuracy" and is hereinafter referred to simply as "recognition accuracy"). The calculator 300 may also calculate the sensing accuracy on the basis of the recognition result from the recognizer 200 or may also calculate the sensing accuracy without using the recognition result obtained by the recognizer 200. A description will be given below in detail.

The calculator 300 calculates the sensing accuracy, for example, on the basis of the recognition result from the recognizer 200. More specifically, the calculator 300 calculates the recognition accuracy on the basis of a difference between the surroundings image obtained during the pattern matching and a pre-stored template. In this case, for example, when the difference between the image of the object captured by the camera and the pre-stored template is small, the calculator 300 calculates the recognition accuracy such that the value thereof is large. Alternatively, for example, the calculator 300 calculates the recognition accuracy on the basis of the number of frames obtained during processing for tracking an object (e.g., a moving object) between different image frames. In this case, for example, the calculator 300 performs the calculation such that the larger the number of frames is, the larger the value of the recognition accuracy becomes. Even when the tracking processing is successful, if the results of the object detection vary greatly between frames, there is the possibility that the recognition accuracy is low. Thus, the calculator 300 may perform the calculation such that, for example, the larger the amount of change in the detection results (the distances, the relative speeds, or the like) between frames is, the lower the recognition accuracy becomes. Also, when a device other than a camera is used as the sensor, features according to a sensor type corresponding to the aforementioned difference between the surroundings image and the template may be used for the recognition accuracy calculation.

The calculator 300 may also calculate the recognition accuracy, for example, on the basis of a recognition result of the vehicle driving environment. For example, when the sensor 100 is a sensing camera, the recognizer 200 performs predetermined image processing on the surroundings image of the vehicle captured by the sensing camera to recognize whether or not the driving environment is a driving environment in which the recognition accuracy is likely to decrease (e.g., whether or not the vehicle is traveling in bad weather, such as in rain, fog, sleet, hail, or snow, whether or not the illuminance in the surroundings of the vehicle is increased due to backlight, the headlights of an oncoming vehicle, or the like, or whether or not the illuminance in the surroundings of the vehicle is reduced due to traveling at night or in a tunnel). When the recognizer 200 recognizes that the driving environment is a driving environment in which the recognition accuracy is likely to decrease, the calculator 300 calculates a smaller value for the recognition accuracy.

Figure 2:
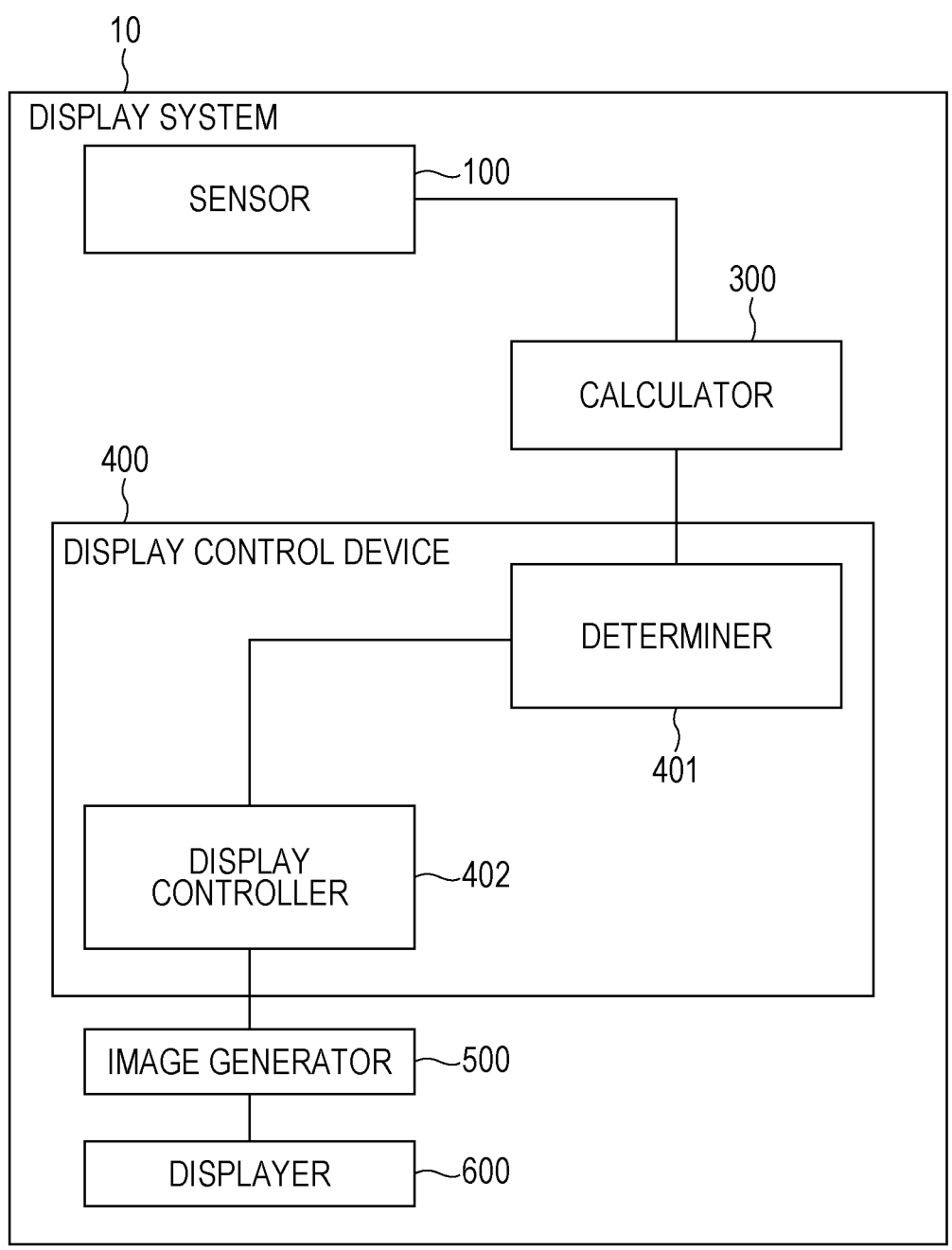
FIG. 2 is a block diagram illustrating an example configuration of the display system according to the first embodiment of the present disclosure.

The calculator 300 may also calculate the recognition accuracy, for example, without using the recognition result from the recognizer 200. An example in this case will now be described with reference to FIG. 2. In FIG. 2, constituent elements that are the same as or similar to those in FIG. 1 are denoted by the same reference numerals, and descriptions thereof are not given hereinafter. FIG. 2 is different from FIG. 1 in that the display system 10 does not have the recognizer 200. In FIG. 2, for example, when the sensor 100 is a sensing camera, the calculator 300 receives a surroundings image of the vehicle from the sensor 100. When the surroundings image of the vehicle includes information indicating that the driving environment is a driving environment in which the recognition accuracy is likely to decrease (e.g., information indicating that the vehicle is traveling in bad weather, such as in rain, fog, sleet, hail, or snow, information indicating that the illuminance in the surroundings of the vehicle is increased due to backlight, the headlights of an oncoming vehicle, or the like, or information indicating that the illuminance in the surroundings of the vehicle is reduced due to traveling at night or in a tunnel), the calculator 300 calculates a smaller value for the recognition accuracy.

In FIG. 2, the sensor 100 may be replaced with another sensor (e.g., a sensor that is substantially the same as a sensor 101 described below in a second embodiment). This sensor is, for example, a raindrop sensor or an illuminance sensor and can detect a driving environment in which the recognition accuracy is likely to decrease (e.g., whether or not the vehicle is traveling in bad weather, such as in rain, fog, sleet, hail, or snow, whether or not the illuminance in the surroundings of the vehicle is increased due to backlight, the headlights of an oncoming vehicle, or the like, or whether or not the illuminance in the surroundings of the vehicle is reduced due to traveling at night or in a tunnel). The calculator 300 receives, from the sensor, information indicating a detection result. When the detection result indicates that the driving environment is a driving environment in which the recognition accuracy is likely to decrease, the calculator 300 calculates a small value for the recognition accuracy.

The calculator 300 then outputs recognition accuracy information indicating the recognition accuracy value to the determiner 401 in the display control device 400.

The determiner 401 determines the recognition accuracy input from the calculator 300. More specifically, the determiner 401 determines whether the recognition accuracy is high or low, on the basis of the recognition accuracy information from the calculator 300 and a pre-defined threshold. For example, when the recognition accuracy value indicated by the recognition accuracy information is larger than or equal to the threshold (or is larger than the threshold), the determiner 401 determines that the recognition accuracy is a high accuracy. On the other hand, for example, when the recognition accuracy value indicated by the recognition result information is smaller than the threshold (or is smaller than or equal to the threshold), the determiner 401 determines that the recognition accuracy is a low accuracy. The above-described method for the recognition accuracy determination made by the determiner 401 is one example, and other methods are described below.

After the determination, the determiner 401 outputs determination result information indicating the determination result to the display controller 402.

When the determiner 401 determines that the recognition accuracy is a first recognition accuracy, the display controller 402 controls the displayer 600 so as to generate a predetermined image that shows a graphic having a predetermined shape and divided into n regions (n is an integer greater than or equal to 2) when displayed on a display medium. Also, when the determiner 401 determines that the recognition accuracy is a second recognition accuracy that is lower than the first recognition accuracy, the display controller 402 controls the displayer 600 so as to generate a predetermined image that shows a graphic having a predetermined shape and undivided or divided into m regions (m is an integer that is greater than or equal to 1 and that is smaller than n) when displayed on a display medium. A description will be given below in detail.

On the basis of the determination result information from the determiner 401, the display controller 402 sets a division number of a pre-defined graphic (i.e., the number of divided regions in the graphic). The "graphic" as used herein refers to image information having a predetermined shape, the image information being pre-stored by the display controller 402 (or a storage unit, not illustrated), and details thereof are described later with reference to FIG. 4. For example, when the determination result information indicates a high accuracy, the display controller 402 sets the division number to n (n is an integer greater than or equal to 2). On the other hand, for example, when the determination result information indicates a low accuracy, the display controller 402 determines that the graphic is not to be divided or sets the division number to m (m is an integer that is greater than or equal to 1 and that is smaller than n).

On the basis of the set division number, the display controller 402 also determines how the graphic is to be divided (hereinafter referred to as a "dividing method"). It is assumed that the determination of the dividing method varies depending on which of the relative angle and the distance is used to set a highlighted region described below.

Specific examples of a process for setting the division number and a process for determining the dividing method are described later with reference to FIGS. 4 to 6F.

The display controller 402 also sets a highlighted region, on the basis of the recognition result information from the recognizer 200. The term "highlighted region" refers to a region displayed highlighted in a post-division graphic, for example, a region indicating the direction ("relative angle") in which an object exists or the distance ("distance") between an object and the vehicle. The highlighted region may be displayed at all times or may be displayed as appropriate. For example, the display controller 402 sets a highlighted region in regions that are divided, on the basis of the relative angle indicated by the recognition result information and a pre-stored table (see FIGS. 7A and 7C). Alternatively, for example, the display controller 402 sets a highlighted region in regions that are divided, on the basis of the distance indicated by the recognition result information and a pre-stored table (see FIGS. 8A and 8C). A specific example of the process for setting the highlighted region is described below with reference to FIGS. 7A to 7D and 8A to 8D.

The display controller 402 outputs control information to the image generator 500. The control information is information for controlling the image generator 500 and includes, for example, information of the shape of a graphic, the division number, the dividing method, and the highlighted region.

The image generator 500 generates a predetermined image, on the basis of the control information from the display controller 402. The predetermined image is displayed on a display medium by the displayer 600 described below and shows a graphic having a predetermined shape.

The graphic having a predetermined shape may be a circular-sector-shaped graphic illustrated in FIGS. 4 to 6F or may be a linear graphic illustrated in FIGS. 18A to 18C. A description for FIGS. 18A to 18C is given later. The graphic having a predetermined shape may be any graphic having a size to such a degree that at least the forward side relative to the position of the driver in the movable body, the front right side and the front left side, or the right direction and the left direction can be distinguished when the graphic is displayed divided on a display medium, and the shape of the graphic does not limit the scope disclosed in the present disclosure. However, it is desirable that the graphic having a predetermined shape be a graphic in which components substantially horizontal to the horizontal axis are larger than components orthogonal thereto, as illustrated in FIGS. 4 to 6F and FIGS. 18A to 19. Display examples of the graphic having a predetermined shape are described later with reference to FIGS. 4 to 6F.

The predetermined image may be an image or may be image data. When the displayer 600 described below has a projector function, the image generator 500 generates an image, and the displayer 600 projects the image. On the other hand, when the displayer 600 described below does not have a projector function, the image generator 500 generates image data, and the displayer 600 outputs the image data.

The displayer 600 outputs the predetermined image, generated by the image generator 500, onto a display (which is not illustrated and is one example of a display medium) to thereby display the graphic having a predetermined shape on the display medium. The displayer 600 has, for example, a projector function and directly projects the graphic onto the display. The display is, for example, the front windshield of a movable body or a transparent combiner provided separately from the windshield. That is, the displayer 600 displays a graphic having a predetermined shape on the windshield by projecting a predetermined image onto the windshield. The occupant in the movable body views the displayed graphic having a predetermined shape as a virtual image. The transparent combiner is, for example, a combiner 801 described below and illustrated in FIG. 20.

The displayer 600 may display a graphic having a predetermined shape, for example, on a display, instead of using the projector function. In this case, the display is a transmissive display, and the predetermined image generated by the image generator 500 is image data. That is, the displayer 600 displays a graphic having a predetermined shape on the transmissive display by outputting image data onto the transmissive display. Since the principle that image data input to a transmissive display is displayed as a graphic having a predetermined shape is known art, a description thereof is not given herein.

The display medium may also be a hologram. When a hologram is used, a system may be used in which a light guide plate that totally internally reflects and guides a group of parallel light beams that satisfies the total internal reflection condition of a light guide plate is used to emit some of a group of parallel light beams totally internally reflected and guided in the light guide plate, to thereby allow the occupant to view a virtual image. Although image data is not directly projected in a system in which a light guide plate is used, unlike a projector, the description herein is given using the definition "projection" as in the projector system, for convenience of description.

Examples of the display include a liquid-crystal display (LCD), a head-up display (HUD), a head-mounted display, a helmet-mounted display (HMD), an eyeglass-type display (smart glasses), a display for navigation, a meter display, and other dedicated displays. The HUD may be, for example, the windshield of the vehicle or a glass surface, a plastic surface, or the like that is additionally provided. For example, the windshield may be the front glass or may be a side window glass or the rear window glass of the vehicle. In addition, the display medium may be a transmissive display, as described above. The transmissive display is, for example, a transmissive organic electroluminescent (EL) display or a transparent display employing glass that emits light upon being illuminated with light having a certain wavelength, and the driver can view what is displayed on the transmissive display, at the same time as viewing the background. The transmissive display is also a display medium that transmits light.

When the display medium is the windshield of a movable body, the displayer 600 displays a graphic having a predetermined shape on the windshield by projecting a predetermined image onto the windshield. When the display medium is a transmissive display, the predetermined image is image data, and the displayer 600 displays a graphic having a predetermined shape on the transmissive display by outputting image data onto the transmissive display. In the present embodiment, "output" is defined as a superordinate concept of "projection", for convenience of description.

The display system 10 may also have a configuration including the above-described display.

The above-described graphics may also be generated by the display control device 400 or another constituent element (not illustrated), not by the image generator 500.

For example, when the predetermined image is projected on a display medium, the occupant in the movable body views a graphic, generated by the display system 10, as a virtual image. In this case, the graphic may also be projected onto the display so as to be superimposed on the occupant's field of view. Since the principle that a driver views a graphic projected on a display as a virtual image is known art, a description thereof is not given herein.

Figure 3:
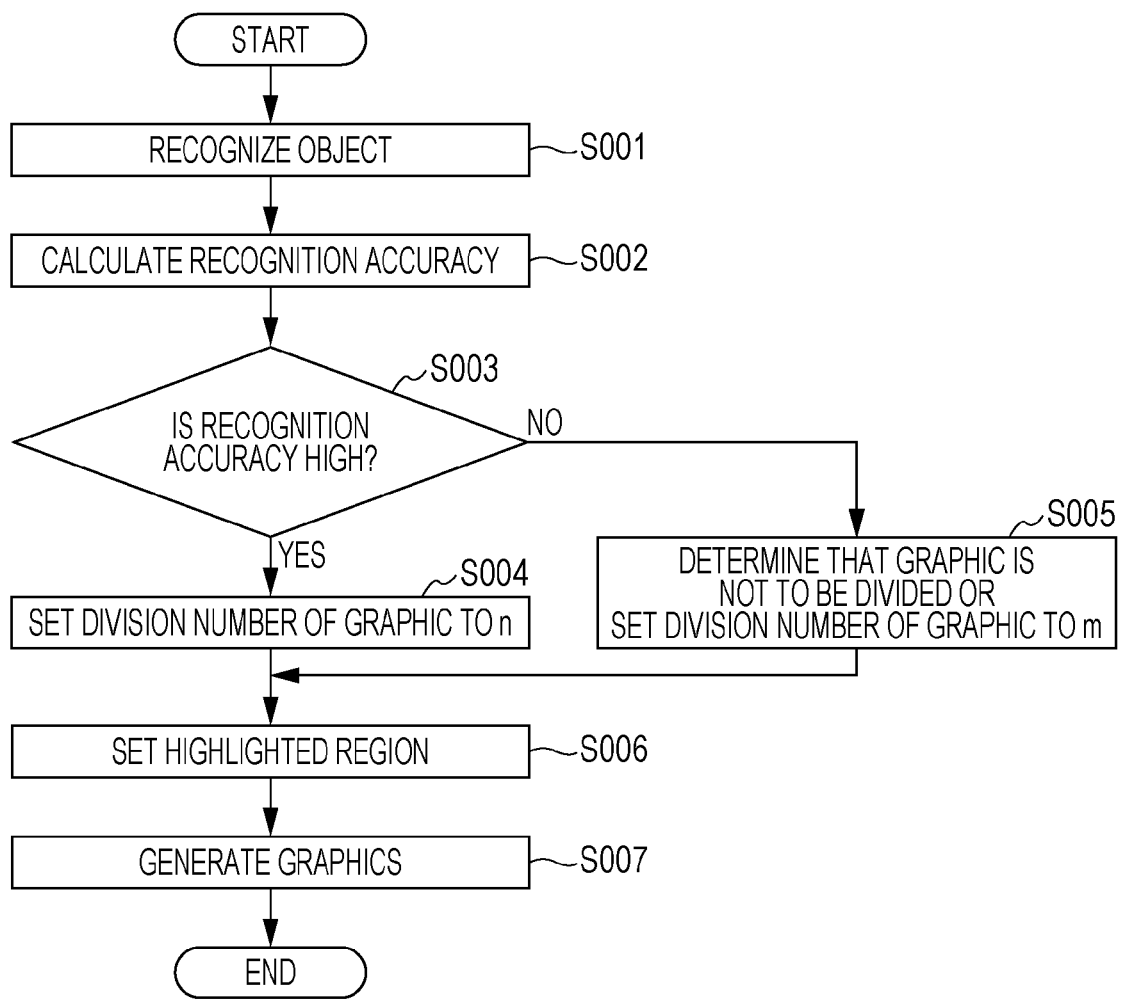
FIG. 3 is a flowchart illustrating an example operation of the display system according to the first embodiment of the present disclosure.

Next, a description will be given of an example operation of the display system 10 according to the present embodiment. FIG. 3 is a flowchart illustrating an example operation of the display system 10 according to the present embodiment. The flow in FIG. 3 is executed, for example, at predetermined operation intervals, such as at intervals of 30 milliseconds or 100 milliseconds. For example, when the sensor 100 is a sensing camera, and the surroundings information is output to the recognizer 200 with a frame rate of 15 fps, 30 fps, or the like, the flow in FIG. 3 may be executed according to the output intervals.

In step S001, the recognizer 200 recognizes an object that exists in the surroundings of the vehicle, on the basis of the surroundings information from the sensor 100.

In step S002, the calculator 300 calculates the recognition accuracy on the basis of the recognition result information from the recognizer 200.

In step S003, the determiner 401 determines whether the recognition accuracy is high or low, on the basis of the recognition result information from the calculator 300 and a pre-defined threshold. That is, if the recognition accuracy value indicated by the recognition result information is larger than or equal to the threshold, the determiner 401 determines that the recognition accuracy is a high accuracy (YES in step S003). In this case, the flow proceeds to step S004. On the other hand, if the recognition accuracy value indicated by the recognition result information is smaller than the threshold, the determiner 401 determines that the recognition accuracy is a low accuracy (NO in step S003). In this case, the flow proceeds to step S005.

When the determination result information from the determiner 401 indicates a high accuracy, in step S004, the display controller 402 sets the division number to n (n is an integer greater than or equal to 2).

When the determination result information from the determiner 401 indicates a low accuracy, in step S005, the display controller 402 determines that the graphic is not to be divided or sets the division number to m (m is an integer that is greater than or equal to 1 and that is smaller than n).

Now, specific examples of the division-number setting process and the dividing-method determination process in steps S004 and S005 will be described with reference to FIGS. 4 to 6F.

Figure 4:
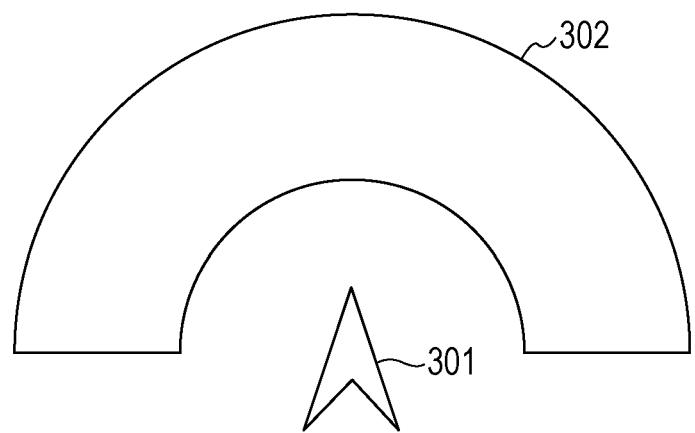
FIG. 4 illustrates a display example of an image according to the first embodiment of the present disclosure.

First, one example of graphics generated by the display system 10 will be described with reference to FIG. 4. In FIG. 4, a graphic 301 represents the vehicle, and a graphic 302 represents the vehicle's surroundings (i.e., a positional relationship between the vehicle and an object). The graphic 301 (one example of a first graphic) is not a graphic to be divided and is used as a reference position during determination of the dividing method. The graphic 302 (one example of a second graphic) is a graphic to be divided, and FIG. 4 illustrates a state before the graphic 302 is divided. The graphics 301 and 302 illustrated in FIG. 4 have default shapes, and the graphics 301 and 302 with these shapes are pre-stored by the display controller 402 (or a storage unit, not illustrated). The graphic 302 is also displayed at all times on the display with the pre-division shape illustrated in FIG. 4 or with any of post-division shapes described below and illustrated in FIGS. 5A to 6F.

Next, a description will be given of setting of the division number. For example, the division numbers and high and low accuracies are pre-associated with each other: for example, the division number is 3 for a low accuracy, and the division number is 5 for a high accuracy, and these associations are stored by the display controller 402. Thus, when the determination result information indicates a low accuracy, the display controller 402 sets the division number to 3, and when the determination result information indicates a high accuracy, the display controller 402 sets the division number to 5.

After setting the division number in the manner described above, the display controller 402 reads the graphics 301 and 302 illustrated in FIG. 4 and determines the dividing method.

Next, the determination of the dividing method will be described with reference to FIGS. 5A to 6F.

Figure 5A:
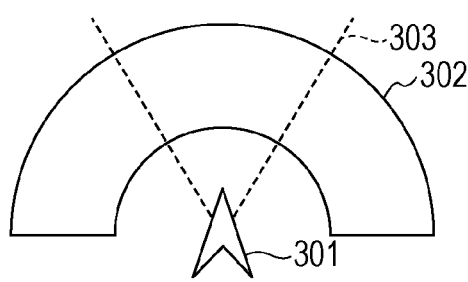
FIGS. 5A to 5F illustrate examples of dividing the image according to the first embodiment of the present disclosure.
Figure 5D:
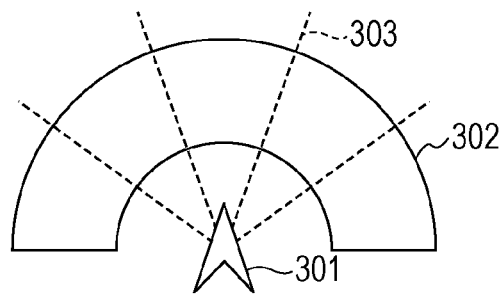
Figure 5B:
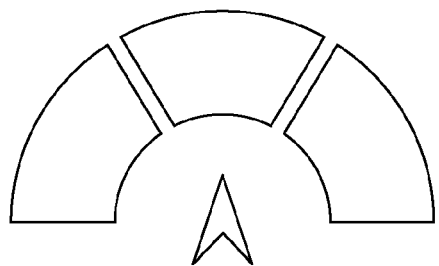
Figure 5E:
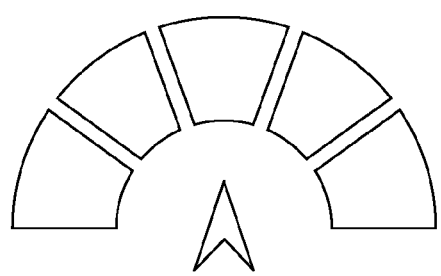
Figure 5C:
Figure 5F:

First, a description will be given of an example of determination of a first dividing method. The first dividing method is a dividing method for a case in which the relative angle is used during setting of the highlighted region. For example, when the division number is set 3 (m=3) in the case of a low accuracy, the display controller 402 determines a dividing method for dividing the graphic 302 into three regions by using division straight lines 303 extending radially from the graphic 301, as illustrated in FIG. 5A. When the displayer 600 executes this dividing method, the graphics are displayed on the display, as illustrated in FIG. 5B or 5C. Also, for example, when the division number is set to 5 (n=5) in the case of a high accuracy, the display controller 402 determines a dividing method for dividing the graphic 302 into five regions by using division straight lines 303 extending radially from the graphic 301, as illustrated in FIG. 5D. When the displayer 600 executes this dividing method, the graphics are displayed on the display, as illustrated in FIG. 5E or 5F.

Figure 6A:
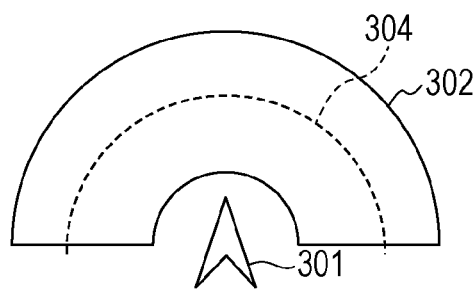
FIGS. 6A to 6F illustrate examples of dividing the image according to the first embodiment of the present disclosure.
Figure 6D:
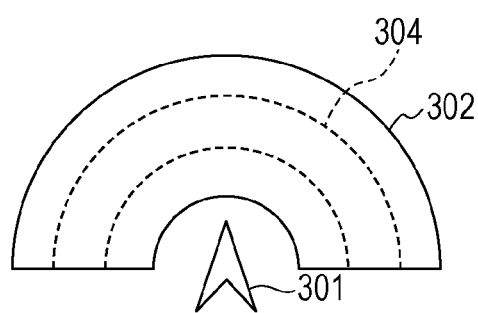
Figure 6B:
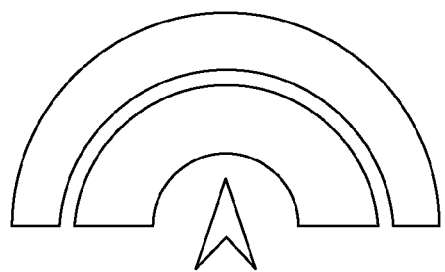
Figure 6E:
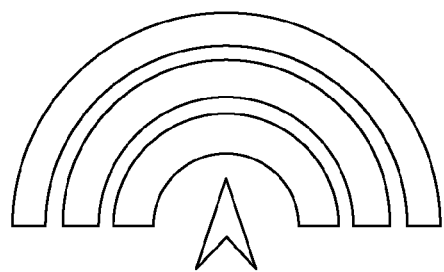
Figure 6C:
Figure 6F:

Next, a description will be given of an example for determining a second dividing method. The second dividing method is a dividing method for a case in which the distance is used during setting of the highlighted region. For example, when the division number is set to 2 (m=2) in the case of a low accuracy, the display controller 402 determines a dividing method for dividing the graphic 302 into two regions by using a division curve line 304 extending in the circumferential direction of a semicircle having its center at the graphic 301, as illustrated in FIG. 6A. When the displayer 600 executes this dividing method, the graphics are displayed on the display, as illustrated in FIG. 6B or 6C. Also, for example, when the division number is set to 3 (n=3) in the case of a high accuracy, the display controller 402 determines a dividing method for dividing the graphic 302 into three regions by using semicircular division curve lines 304 (in this case, a plurality of division curve lines having different radii) having their center at the graphic 301, as illustrated in FIG. 6D. When the displayer 600 executes this dividing method, the graphics are displayed on the display, as illustrated in FIG. 6E or 6F.

Although each of the graphics has been described above as being equally divided, the present disclosure is not limited thereto. When the dividing method is pre-specified for each division number, it is possible to divide the graphic by using an arbitrary dividing method.

The description above has been given of specific examples of the division-number setting process and the dividing-method determination process. Now, a description will return to the flow in FIG. 3.

In step S006, the display controller 402 sets a highlighted region, on the basis of the recognition result information from the recognizer 200.

Now, a specific example of the highlighted-region setting process in step S006 will be described with reference to FIGS. 7A to 7D and 8A to 8D. As described above, the highlighted region is set using either the relative angle or the distance included in the recognition result information from the recognizer 200.

First, the highlighted-region setting process when the relative angle is used (when the first dividing method is determined) will be described with reference to FIGS. 7A to 7D.

FIG. 7A illustrates an example of a first table used when the recognition accuracy is a low accuracy and the relative angle is used to set the highlighted region. The first table is pre-stored by the display controller 402 (or a storage unit, not illustrated). In the first table, relative angles, which are conditions, and highlighted regions are associated with each other. In the first table, angle A is a horizontal angle relative to the forward direction of the vehicle (or the position of the sensor or the position of the driver), and the angle to the right is a positive angle. For example, when the relative angle included in the recognition result information indicates 40 degrees (A=40) to the right, the display controller 402 sets the highlighted region to a region 603. When the displayer 600 executes this highlighted-region display process, for example, the region 603 is displayed highlighted on the display by using color different from the color of regions 601 and 602, as illustrated in FIG. 7B.

FIG. 7C illustrates an example of a second table used when the recognition accuracy is a high accuracy and the relative angle is used to set the highlighted region. The second table is pre-stored by the display controller 402 (or a storage unit, not illustrated), as in the first table, and relative angles, which are conditions, and highlighted regions are associated with each other. For example, when the relative angle included in the recognition result information indicates 40 degrees (A=40) to the right, the display controller 402 sets the highlighted region to a region 607. When the displayer 600 executes this highlighted-region display process, for example, the region 607 is displayed highlighted on the display by using color different from the color of regions 604 to 606 and 608, as illustrated in FIG. 7D.

Next, the highlighted-region setting process when the distance is used (when the second dividing method is determined) will be described with reference to FIGS. 8A to 8D.

FIG. 8A illustrates an example of a third table used when the recognition accuracy is a low accuracy and the distance is used to set the highlighted region. The third table is pre-stored by the display controller 402 (or a storage unit, not illustrated). In the third table, distances (e.g., in units of meters (m)), which are conditions, and highlighted regions are associated with each other. For example, when the distance included in the recognition result information indicates 55 m (D=55), the display controller 402 sets the highlighted region to a region 702. When the displayer 600 executes this highlighted-region display process, for example, the region 702 is displayed highlighted on the display by using color different from the color of a region 701, as illustrated in FIG. 8B.

FIG. 8C illustrates an example of a fourth table used when the recognition accuracy is a high accuracy and the distance is used to set the highlighted region. The fourth table is pre-stored by the display controller 402 (or a storage unit, not illustrated), as in the third table, and distances, which are conditions, and highlighted regions are associated with each other. For example, when the distance included in the recognition result information indicates 55 m (D=55), the display controller 402 sets the highlighted region to a region 704. When the displayer 600 executes this highlighted-region display process, for example, the region 704 is displayed highlighted on the display by using color different from the color of regions 703 and 705, as illustrated in FIG. 8D.

The description above has been given of a specific example of the highlighted-region setting process.

After setting the highlighted region, the display controller 402 outputs, to the displayer 600, control information for performing control so that a graphic is generated and displayed on the display on the basis of the set division number, the determined dividing method, and the set highlighted region. Now, a description will return to the flow in FIG. 3.

In step S007, on the basis of the control information from the display controller 402, the displayer 600 generates the graphics and displays the graphics on the display. As a result, for example, the graphics illustrated in FIG. 7B, 7D, 8B, or 8D are displayed.

Next, a description will be given of another example configuration of the display system 10 illustrated in FIG. 17. As described above, the display system 10 includes the detection device 700, the calculator 300, the display control device 400, the image generator 500, and the displayer 600. The display control device 400 has the obtainer 404 and the controller 405. The functions of the controller 405 are the same as or similar to those of the determiner 401 and the display controller 402. The constituent elements of the display system 10 will be described below with reference to FIG. 17.

The detection device 700 detects a predetermined object that exists in the surroundings of a movable body. The detection device 700 has at least a sensor 100. The detection device 700 may also have a recognizer 200. Thus, a detection result of the detection device 700 includes at least a sensing result. The detection device 700 senses the surroundings of the vehicle at predetermined time intervals. Whether or not a predetermined object is to be recognized based on the surroundings information of the movable body, the surroundings information being a sensing result, is determined based on the specifications of the detection device 700. When the detection device 700 is to recognize a predetermined object, the detection device 700 recognizes a predetermined object on the basis of the surroundings information. A method for recognizing an object is the same as or similar to that described above.

The calculator 300 calculates a detection accuracy of the detection device 700. The detection accuracy is analogous to the recognition accuracy. The calculator 300 outputs detection accuracy information indicating a detection accuracy value to the display control device 400. Since a method for calculating the detection accuracy is the same as or similar to that described above, a description thereof is not given hereinafter.

The obtainer 404 in the display control device 400 obtains the detection accuracy from the calculator 300. When the display control device 400 is implemented by hardware, the obtainer 404 is an input portion, for example, a connector and an input terminal.

As described above, the controller 405 has functions that are the same as or similar to those of the determiner 401 and the display controller 402. That is, on the basis of the detection accuracy, the controller 405 controls the image generator 500 so as to generate a predetermined image that shows a graphic having a predetermined shape when displayed on a display medium.

On the basis of the control information from the display controller 402, the image generator 500 generates the predetermined image. The predetermined image is displayed on a display medium by the displayer 600 described below and shows a graphic having a predetermined shape. Display examples of the graphic having a predetermined shape are described later with reference to FIGS. 7A to 8D. The predetermined image may be an image or may be image data. When the displayer 600 described below has a projector function, the image generator 500 generates an image, and the displayer 600 projects the image. On the other hand, when the displayer 600 described below does not have a projector function, the image generator 500 generates image data, and the displayer 600 outputs the image data.

The displayer 600 outputs the predetermined image, generated by the image generator 500, onto a display (which is not illustrated and is one example of a display medium) to thereby display the graphic having a predetermined shape on the display medium. The displayer 600 has, for example, a projector function and directly projects the graphic onto the display. The display is, for example, the front windshield of a movable body or a transparent combiner (e.g., the combiner 801 illustrated in FIG. 20) provided separately from the windshield. That is, the displayer 600 displays a graphic having a predetermined shape on the windshield by projecting a predetermined image onto the windshield. The occupant in the movable body views the displayed graphic having a predetermined shape as a virtual image.

Figure 21:
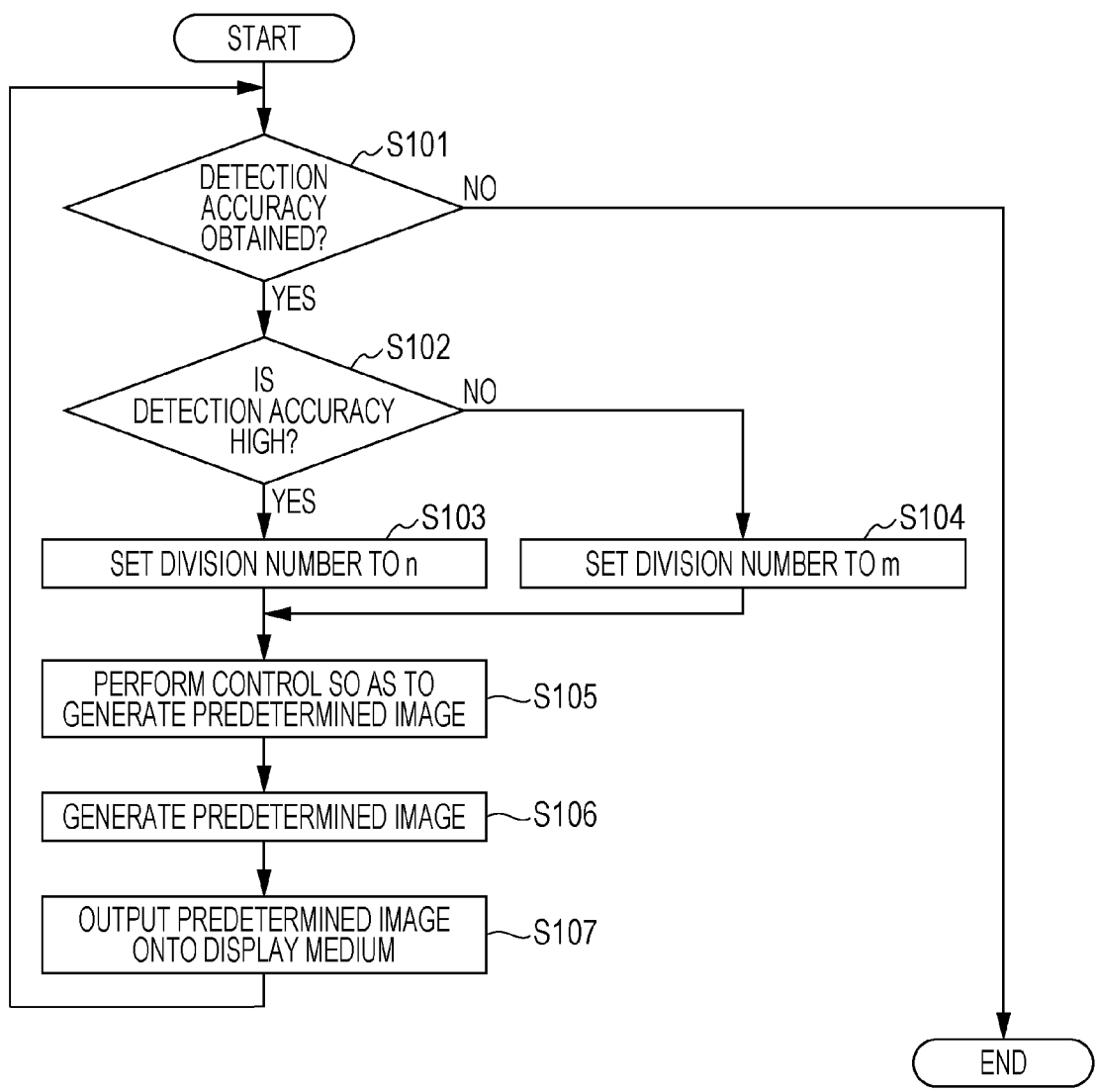
FIG. 21 is a flowchart illustrating an example operation of the display control device in the display system illustrated in FIG. 17.

FIG. 21 is a flowchart illustrating an example operation of the display control device 400 included in the display system 10 illustrated in FIG. 17. An example operation of the controller 405 will be described below with reference to FIGS. 17 and 21.

In step S101, when the obtainer 404 obtains the detection accuracy (YES in step S101), the flow proceeds to step S102 in which the controller 405 determines whether the recognition accuracy is high or low on the basis of the detection accuracy and a pre-defined threshold. When the obtainer 404 does not obtain the detection accuracy (NO in step S101), the flow ends.

When the detection accuracy is higher than or equal to the threshold in step S102, the controller 405 determines that the detection accuracy is a high accuracy (YES in step S102). In this case, the flow proceeds to step S103. On the other hand, when the detection accuracy is lower than the threshold in step S102, the controller 405 determines that the detection accuracy is a low accuracy (NO in step S102). In this case, the flow proceeds to step S104.

In step S103, the controller 405 sets the division number to n (n is an integer greater than or equal to 2).

In step S104, the controller 405 determines that the graphic is not to be divided or sets the division number to m (m is an integer that is greater than or equal to 1 and that is smaller than n).

Specific examples of the division-number setting process and the dividing-method determination process in steps S103 and S104 are substantially the same as those described above with reference to FIGS. 4 to 6F.

Next, in step S105, the controller 405 controls the image generator 500 so as to generate a predetermined image. The "predetermined image" as used in this case refers to an image that shows a graphic having a predetermined shape when displayed on a display medium. The graphic having a predetermined shape may be any of the graphics described above with reference to FIGS. 4 to 6F.

For example, upon setting the division number to n in step S103, the controller 405 controls the image generator 500 so as to generate a predetermined image that shows a graphic divided into n regions by using the determined dividing method. On the other hand, upon determining that the division is not to be performed or setting the division number to m in step S103, the controller 405 controls the image generator 500 so as to generate a predetermined image that shows an undivided graphic or a graphic divided into m regions by using the determined dividing method.

Next, in step S106, under the control of the controller 405, the image generator 500 generates the predetermined image.

Next, in step S107, the displayer 600 outputs the predetermined image, generated by the image generator 500, onto a display medium to thereby display the graphic having a predetermined shape on the display medium. The flow then returns to step S101.

As described above, the detection device 700 detects a predetermined object that exists in the surroundings of a movable body, and the calculator 300 calculates the detection accuracy of the detection device 700. The image generator 500 generates a predetermined image, and the displayer 600 outputs the predetermined image onto a display medium to thereby display a graphic having a predetermined shape on the display medium. The display control device 400 has the obtainer 404 for obtaining the detection accuracy and the controller 405 for controlling, on the basis of the detection accuracy, the image generator 500 so as to generate a predetermined image that shows a graphic having a predetermined shape when displayed on the display medium. When the obtainer 404 obtains a first detection accuracy (a high accuracy), the controller 405 controls the image generator 500 so as to generate a first predetermined image that shows a first graphic having a predetermined shape and divided into n regions when displayed on the display medium. When the obtainer 404 obtains a second detection accuracy (a low accuracy) that is lower than the first detection accuracy (the high accuracy), the controller 405 controls the image generator 500 so as to generate a second predetermined image that shows a second graphic having a predetermined shape and divided into m regions or undivided when displayed on the display medium. In this case, n is an integer greater than or equal to 2, and m is an integer that is greater than or equal to 1 and that is smaller than n.

Ideally, the predetermined image is the same as the graphic having a predetermined shape. Although the predetermined image and the graphic having a predetermined shape are somewhat different from each other depending on the conditions, such as the degree of curvature of the display medium, they are substantially the same. The predetermined image is generated by the image generator 500, and the graphic having a predetermined shape is displayed on the display medium. The highlighted-region setting described above with reference to FIGS. 7A to 7D may also be performed only when an object for which caution is to be given exists in the surroundings of the vehicle. That is, in the display system 10 in the present embodiment, setting the highlighted region and displaying the highlighted region on a display medium is not essential processing. Any processing may be used as long as a graphic having a predetermined shape is displayed on a display medium on the basis of the detection accuracy.

Figure 22:
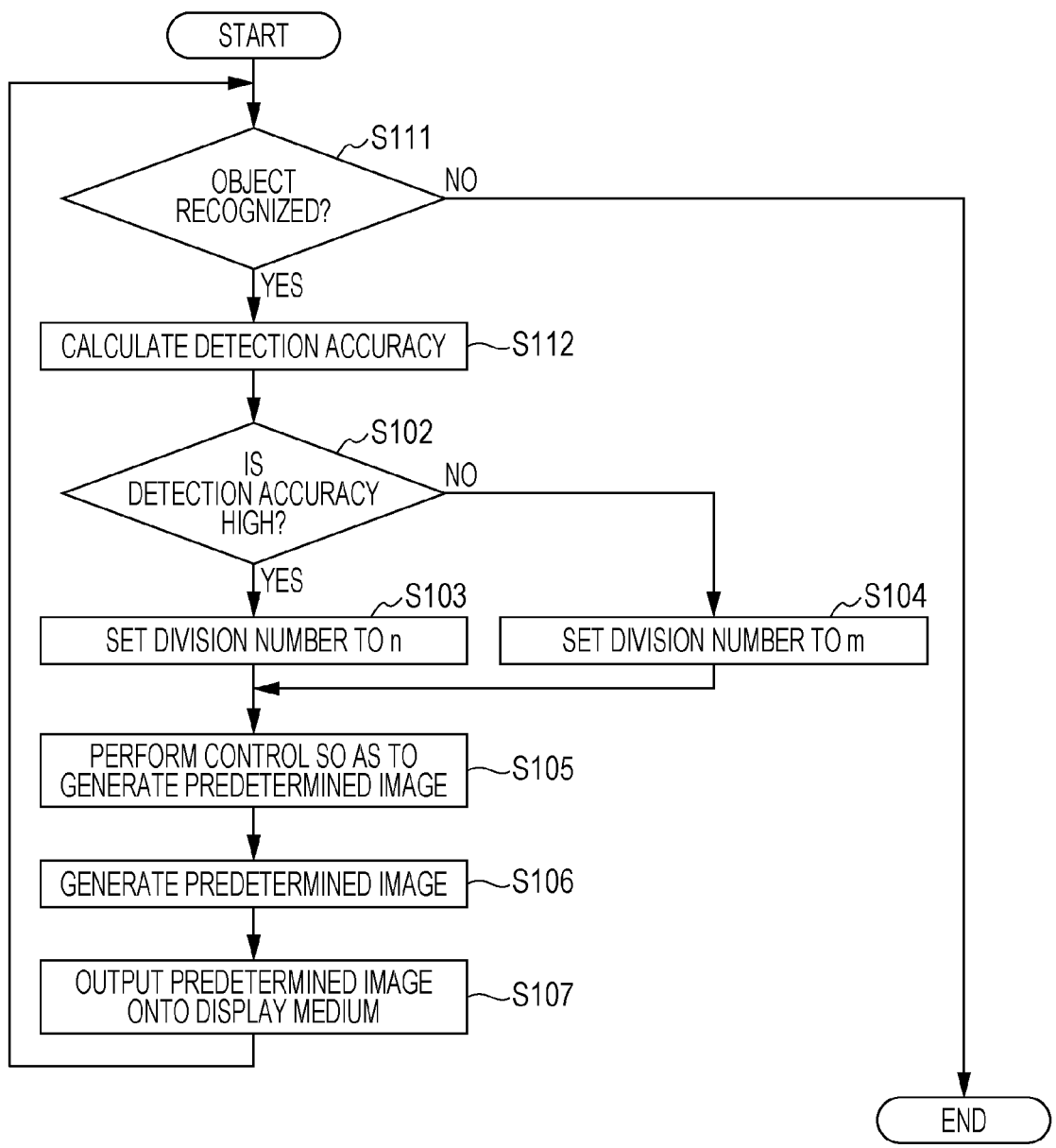
FIG. 22 is a flowchart illustrating another example operation of the display control device in the display system illustrated in FIG. 17.

FIG. 22 illustrates a processing flow of the display system 10 illustrated in FIG. 17, when the display system 10 displays a graphic having a predetermined shape on a display medium upon recognizing a predetermined object that exists in the surroundings of a movable body. The processing flow will be described below.

In step S111, when the detection device 700 recognizes a predetermined object that exists in the surroundings of the movable body (YES in step S111), the flow proceeds to step S112. When the detection device 700 does not recognize a predetermined object (NO in step S111), the flow ends.

In step S112, the calculator 300 calculates the detection accuracy, and then the flow proceeds to step S102. Since the subsequent processes are substantially the same as those in FIG. 21, descriptions thereof are not given hereinafter.

Figure 23A:
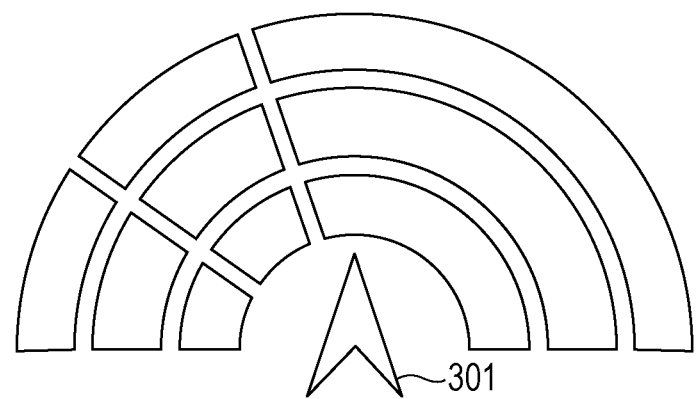
FIGS. 23A and 23B illustrate examples of dividing the image according to the first embodiment of the present disclosure.
Figure 23B:
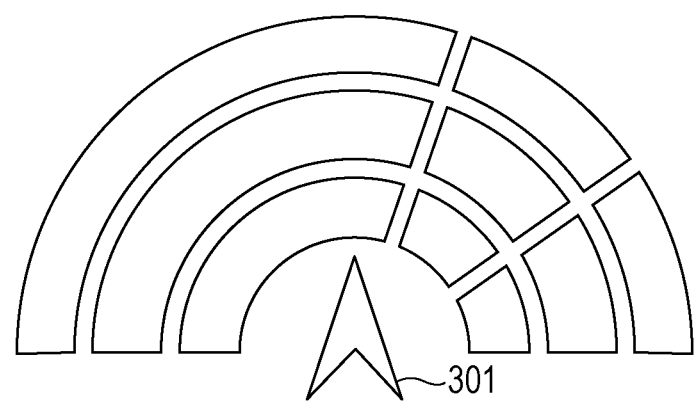
Figure 24A:
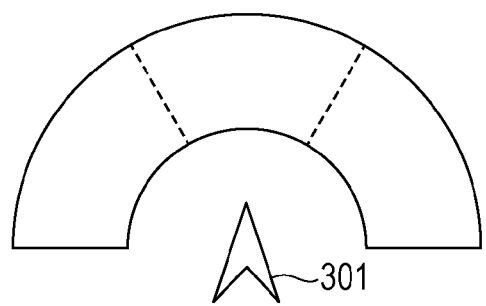
FIGS. 24A to 24D illustrate examples of dividing the image according to the first embodiment of the present disclosure.
Figure 24B:
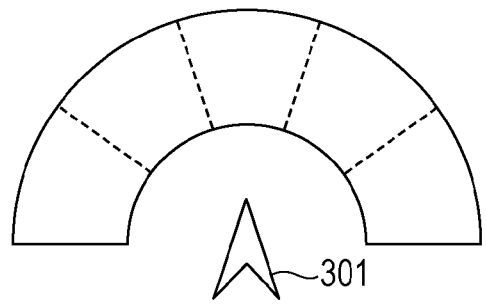
Figure 24C:
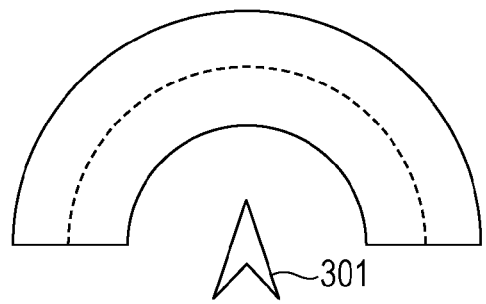
Figure 24D:
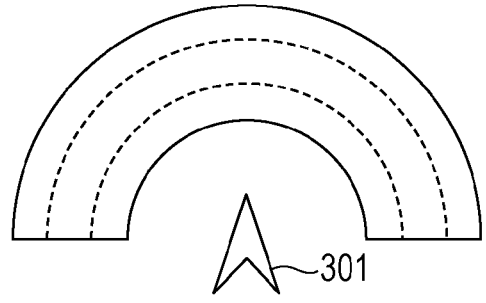
Figure 25A:
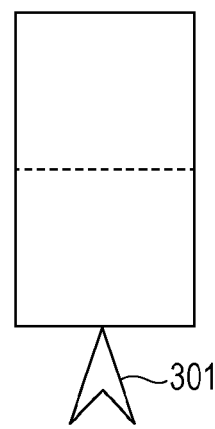
FIGS. 25A to 25D illustrate examples of dividing the image according to the first embodiment of the present disclosure.
Figure 25B:
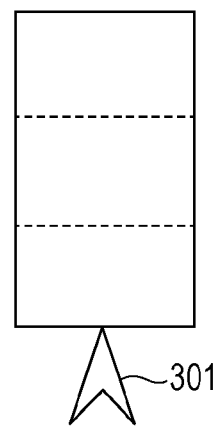
Figure 25C:
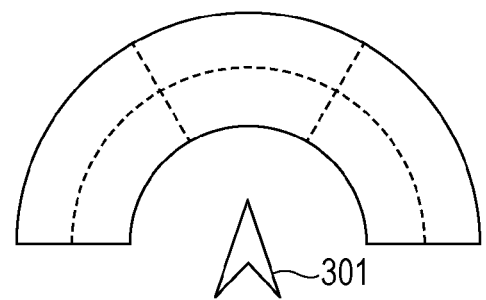
Figure 25D:
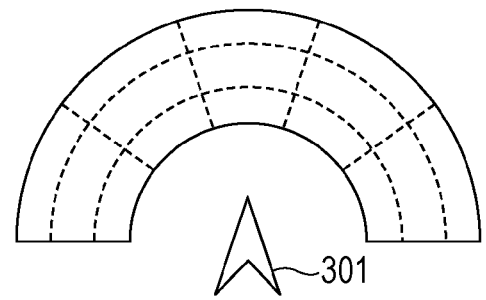

The graphic having a predetermined shape does not necessarily have to be equally divided. For example, the graphic does not necessarily have to be equally divided at the left and right sides, as illustrated in FIGS. 23A and 23B. For example, when the detection device 700 is a camera, there is the possibility that the recognition accuracy decreases partially at the front left side of the vehicle, the front right side of the vehicle, or the like, depending on sunlight conditions, such as shade. In accordance with the recognition accuracies that differ from one place to another, the detection device 700 may also change the division number of a portion of the graphic having a predetermined shape, rather than changing the division number of the entire graphic. FIG. 23A illustrates a display example when the recognition accuracy for the front right side, viewed from the vehicle, has decreased and the display resolution for only the front right side has decreased. On the other hand, FIG. 23B illustrates a display example when the recognition accuracy for the front left side, viewed from the vehicle, has decreased and the display resolution for only the front left side has decreased.

Also, the division of the graphic having a predetermined shape may be only sectioned with a dashed line(s), as illustrated in FIGS. 24A to 24D and FIGS. 25A to 25D. In addition, the lines may not only be the dashed lines, but also be solid lines, dashed-dotted lines, or dotted lines.

Additionally, the graphic having a predetermined shape is not limited to a circular-sector shape and may be a linear shape substantially parallel to the horizontal axis, as illustrated in FIGS. 18A to 18C. This is because, even with the linear shape, it is possible to recognize the direction of a predetermined object that exists in the surroundings of a movable body. FIG. 18A illustrates a state in which a graphic is not divided, and FIGS. 18B and 18C illustrate states in which a graphic is divided.

Figure 20:
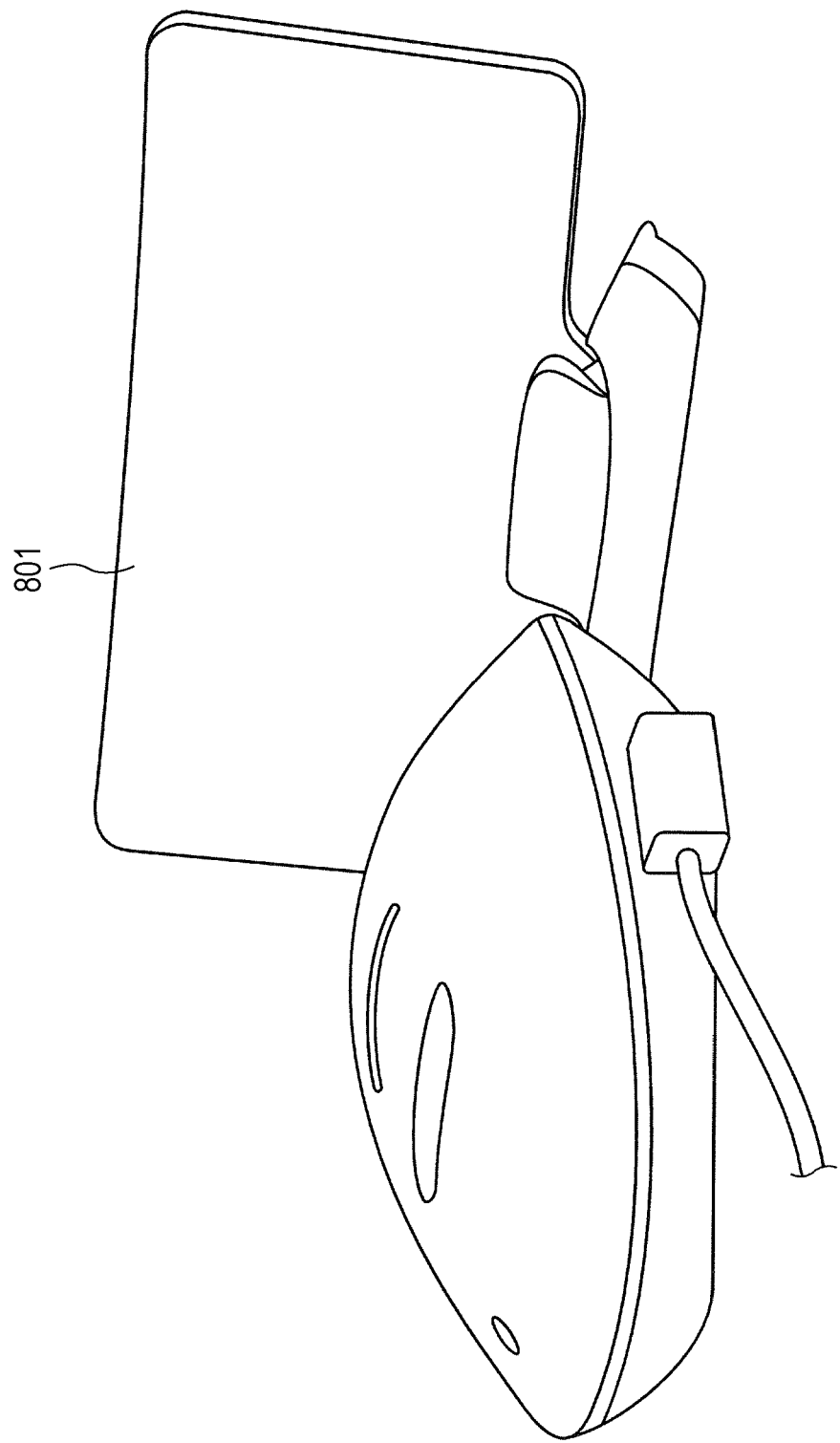
FIG. 20 illustrates one example of a combiner according to the first embodiment of the present disclosure.

In the above description, the display device 20 has been described as having the display control device 400, the image generator 500, and the displayer 600. However, when the display medium is a combiner, the display device 20 may also have the display medium. FIG. 20 illustrates an example configuration of the display device 20 when the display medium is a combiner. The display device 20 has the combiner 801 serving as a display medium.

As described above, the present embodiment has the feature that the graphic indicating the recognition accuracy is displayed on the display at all times, and the division number of the graphic is changed according to the recognition accuracy. This allows the driver of the vehicle to intuitively recognize the recognition accuracy at all times. As a result, the driver can perform driving and operation without excessively relying on the display system.

Also, the present embodiment has a feature that, even when the results (e.g., the relative angles or the distances) of the object recognition performed by the recognizer are the same, the division number of the graphic and the position of the highlighted region are changed according to the recognition accuracy. As a result, the direction in which an object exists or the distance between an object and the vehicle can be displayed with a low resolution when the recognition accuracy is low or can be displayed with a high resolution when the recognition accuracy is high.

Although the first embodiment of the present disclosure has been described thus far, the present disclosure is not limited to the first embodiment, and various modifications are possible thereto. Modifications will be described below.

Modification 1

Figure 9A:
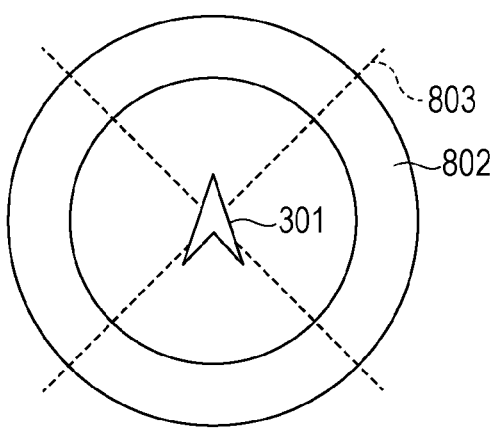
FIGS. 9A to 9F illustrate examples of dividing an image according to the first embodiment of the present disclosure.
Figure 9D:
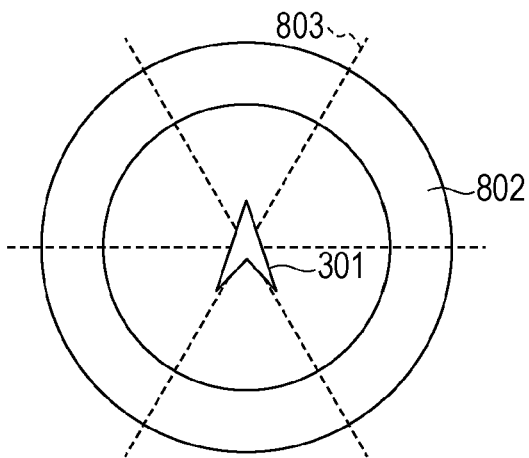
Figure 9B:
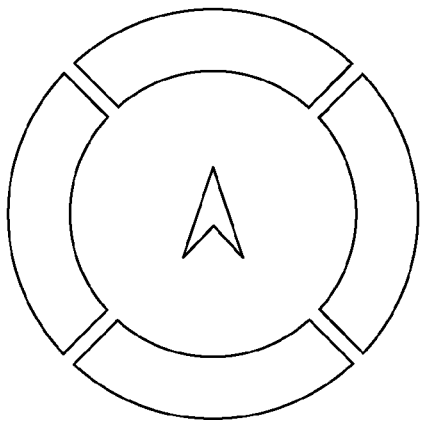
Figure 9E:
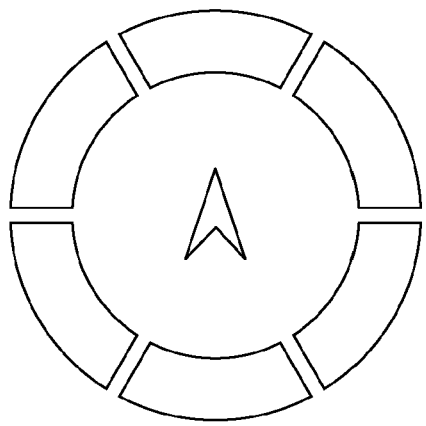
Figure 9C:
Figure 9F:
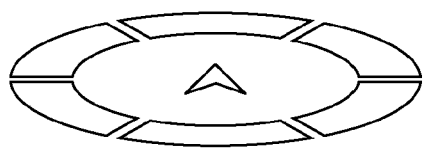

Although the second graphic to be divided is semicircular (see e.g., the graphic 302 in FIG. 4) in the embodiment described above, the shape of the second graphic is not limited thereto. For example, use of a sensor that can sense the sides and rear of the vehicle in addition to the front of the vehicle as the sensor 100 makes it possible to detect objects in all directions in the surroundings of the vehicle. In this case, the displayer 600 may also use, for example, an annular graphic 802 (one example of the second graphic) indicating the vehicle and its surroundings in all directions, as illustrated in FIGS. 9A and 9B. For example, when the relative angle is used to set a highlighted region, and the recognition accuracy is a low accuracy, the display controller 402 sets the division number to 4 (m=4) and then determines a dividing method for dividing the graphic 802 into four regions by using division straight lines 803 passing through the graphic 301, as illustrated in FIG. 9A. When the displayer 600 executes this dividing method, the graphics are displayed on the display, as illustrated in FIG. 9B or 9C. Also, for example, when the relative angle is used to set the highlighted region, and the recognition accuracy is a high accuracy, the display controller 402 sets the division number to 6 (n=6) and then determines a dividing method for dividing the graphic 802 into six regions by using division straight lines 803 passing through the graphic 301, as illustrated in FIG. 9D. When the displayer 600 executes this dividing method, the graphics are displayed on the display, as illustrated in FIG. 9E or 9F.

Modification 2

Figure 10A:
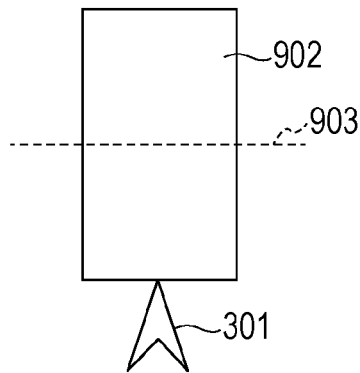
FIGS. 10A to 10F illustrate examples of dividing the image according to the first embodiment of the present disclosure.
Figure 10D:
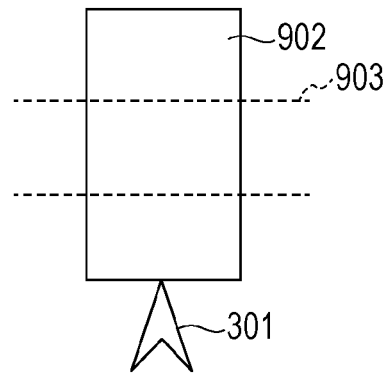
Figure 10B:
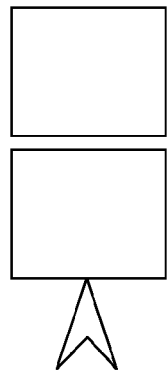
Figure 10E:
Figure 10C:
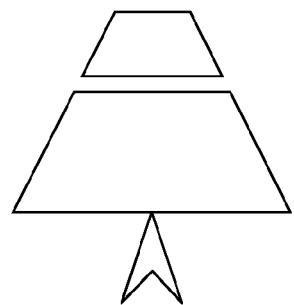
Figure 10F:
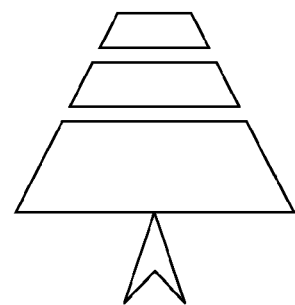

When the distance is used to set the highlighted region, for example, a polygonal graphic 902 may also be used as the second graphic to be divided, as illustrated in FIGS. 10A and 10B. For example, when the recognition accuracy is a low accuracy, the display controller 402 sets the division number to 2 (m=2) and then determines a dividing method for dividing the graphic 902 into two regions by using a division straight line 903 extending in a direction orthogonal to the vehicle traveling direction (indicated by the front edge of the graphic 301), as illustrated in FIG. 10A. When the displayer 600 executes this dividing method, the graphics are displayed on the display, as illustrated in FIG. 10B or 10C. Also, for example, when the recognition accuracy is a high accuracy, the display controller 402 sets the division number to 3 (n=3) and then determines a dividing method for dividing the graphic 902 into three regions by using division straight lines 903 orthogonal to the vehicle traveling direction, as illustrated in FIG. 10D. When the displayer 600 executes this dividing method, the graphics are displayed on the display, as illustrated in FIG. 10E or 10F.

Modification 3

Figure 11A:
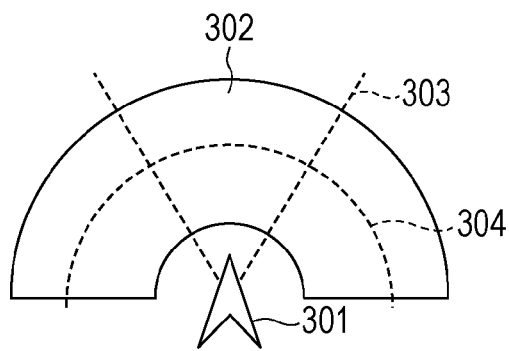
FIGS. 11A to 11F illustrate examples of dividing the image according to the first embodiment of the present disclosure.
Figure 11D:
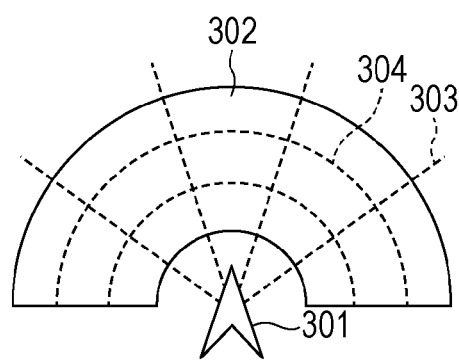
Figure 11B:
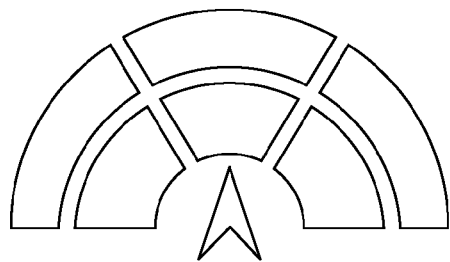
Figure 11E:
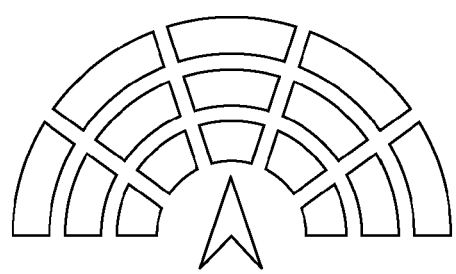
Figure 11C:
Figure 11F:

Although the description in the above embodiment has been given of an example in which the first dividing method is executed when the relative angle is used to set the highlighted region and the second dividing method is executed when the distance is used to set the highlighted region, the present disclosure is not limited thereto. For example, both the relative angle and the distance may also be used to set the highlighted region. In such a case, the first dividing method and the second dividing method may also be combined together. For example, when the recognition accuracy is a low accuracy, the display controller 402 determines a dividing method for dividing the graphic 302 into three regions by using division straight lines 303 and dividing the graphic 302 into two regions by using a division curve line 304, as illustrated in FIG. 11A. When the displayer 600 executes this dividing method, the graphics are displayed on the display, as illustrated in FIG. 11B or 11C. Also, for example, when the recognition accuracy is a high accuracy, the display controller 402 determines a dividing method for dividing the graphic 302 into five regions by using division straight lines 303 and dividing the graphic 302 into three regions by using division curve lines 304, as illustrated in FIG. 11D. When the displayer 600 executes this dividing method, the graphics are displayed on the display, as illustrated in FIG. 11E or 11F. Although the highlighted region is not illustrated in FIGS. 11A to 11F, it may be displayed through processing as described below. For example, when both the relative angle and the distance have high accuracies, one of the regions divided by the division straight lines 303 and the division curve lines 304 illustrated in FIG. 11D may also be displayed as a highlighted region. Also, for example, when the distance has a low accuracy and the relative angle has a high accuracy, the graphic 302 is divided into three regions in the circumferential direction, as illustrated in FIG. 11A, with respect to the distance, and the graphic 302 is divided into five regions by using straight lines passing through the graphic 301, as illustrated in FIG. 11D, with respect to the relative angle, and then one of the divided regions may be set as a highlighted region.

Modification 4

In order to further enhance the recognition accuracy, for example, the display system 10 may also be configured to have a plurality of types of sensors, such as a millimeter-wave sensor, a camera, and a laser radar, as the sensor 100. In this case, the calculator 300 may calculate the recognition accuracy such that the larger the number of types of sensors that operate, the higher the recognition accuracy is. The calculator 300 may also calculate the recognition accuracy on the basis of the number of sensors that are operating properly or the number of sensors that are out of order among the plurality of sensors.

Modification 5

When the division number of the second graphic is changed according to the recognition accuracy, this means that the display area of the highlighted region changes. The area of the highlighted region is not intended to indicate the degree of risk (the possibility that the vehicle collides with an object, also called the degree of urgency). However, for example, when the area of the highlighted region increases, it may give the occupant an erroneous impression, that is, an impression that the degree of risk has increased. Accordingly, when the area of the highlighted region changes from a small area to a large area, the display controller 402 may perform control such that the luminance of the highlighted region after the change is lower than the luminance of the highlighted region before the change. For example, when the recognition accuracy decreases during display of the graphics illustrated in FIG. 7D, and the graphics being displayed are switched to the graphics illustrated in FIG. 7B, the display controller 402 performs control such that the luminance of the region 603 is lower than the luminance of the region 607. On the other hand, when the area of the highlighted region changes from a large area to a small area, the display controller 402 may perform control such that the luminance of the highlighted region after the change is higher than the luminance of the highlighted region before the change. For example, when the recognition accuracy increases during display of the graphics illustrated in FIG. 7B, and the graphics being displayed are switched to the graphics illustrated in FIG. 7D, the display controller 402 performs control such that the luminance of the region 607 is higher than the luminance of the region 603. As a result of such control, it is possible to avoid giving the occupant the above-noted erroneous impression.

Modification 6

Although, in the above embodiment, the position of the highlighted region is determined according to the relative angle during setting of the highlighted region, a method that is different therefrom may also be used to set the highlighted region. An example of such a method will be described with reference to the graphics illustrated in FIG. 7B. For example, when the vehicle is traveling in the center lane of three parallel lanes, and another vehicle is traveling ahead in the same lane as an object to be recognized, the display controller 402 sets the highlighted region to the region 602. When another vehicle is traveling ahead in the right lane, the display controller 402 sets the highlighted region to the region 603. Also, when another vehicle is traveling ahead in the left lane, the display controller 402 sets the highlighted region to the region 601.

Modification 7

Although, in the above-described embodiment, the determiner 401 compares the recognition accuracy with the threshold to thereby make the binary determination as to whether the recognition accuracy is a high accuracy or low accuracy, the present disclosure is not limited thereto. For example, a plurality of thresholds may also be used to determine the recognition accuracy with three values or more. This makes it possible to increase the number of patterns of the division number of the graphic and makes it possible to inform the driver of a more specific recognition accuracy. The driver can also be more specifically informed of the direction in which an object exists and/or the distance to the object.

Modification 8

Although the description in the above embodiment has been given of an example in which the determiner 401 determines whether the accuracy is high or low and the display controller 402 sets the division number on the basis of the accuracy determination, the present disclosure is not limited thereto. For example, the determiner 401 may also set the division number. For example, the determiner 401 may set the division number on the basis of a table in which the recognition accuracy values and the division numbers are associated with each other and the recognition accuracy value from the calculator 300 and may output the set division number to the display controller 402 as the determination result information. Alternatively, for example, the determiner 401 may calculate the division number by using a predetermined mathematical expression for calculating the division number from the recognition accuracy value calculated by the calculator 300 and may output the calculated division number to the display controller 402 as the determination result information. The display controller 402 may also be configured so as to directly receive the recognition accuracy value from the calculator 300, to thereby allow the display controller 402 to perform the processing in this modification (in this case, the determiner 401 can be eliminated from the configuration).

Modification 9

The first graphic or the second graphic may be a graphic that is entirely painted with a predetermined color or may be a graphic whose only outline is colored with a predetermined color.

Modification 10

The color of the first graphic and/or the second graphic may also be changed depending on whether or not an object is detected by the sensor 100. For example, when no object is detected, the display controller 402 displays the graphic by using a color (e.g., blue or green) that gives the driver an impression that the degree of risk is low. On the other hand, when an object is detected, the display controller 402 displays the graphic by using a color (e.g., yellow or red) that gives the driver an impression that the degree of risk is high.

Modification 11

The color of the highlighted region may also be changed according to the distance. For example, the display controller 402 performs control so as to use yellow when the distance is larger than or equal to a predetermined value and so as to use red when the distance is smaller than the predetermined value.

Modification 12

Even when the sensor 100 is of the same type, the range that can be sensed is different from sensor to sensor. For example, when the sensor 100 is a camera, it may have a small detection range (e.g., 10 degrees horizontally at each side centered on the forward direction) or may have a large detection range (e.g., 30 degrees horizontally at each side centered on the forward direction), depending on a difference in the lens used. Accordingly, the overall shape of the second graphic may be changed so as to indicate the sensing range. An example of such an arrangement will be described with reference to the graphic 302 illustrated in FIG. 4. For example, when the sensing range is small, the angle of the graphic 302 is reduced to change the overall shape thereof to a more acute circular-sector shape. This allows the driver to intuitively recognize that the sensing range is small.

Modification 13

Although the description in the above embodiment has been given of an example in which the display controller 402 determines the dividing method by using the division straight line(s) or the division curve line(s) in accordance with the set division number, the present disclosure is not limited thereto. For example, the display controller 402 (or a storage unit, not illustrated) may hold the second graphic divided by a predetermined division number as a template. In such a case, the display controller 402 selects a template corresponding to the determination result of the determiner 401, as appropriate.

Modification 14

For example, when the recognizer 200 recognizes a plurality of objects, the calculator 300 and the determiner 401 may calculate and determine the recognition accuracies for the respective objects. In addition, for example, in accordance with the calculated recognition accuracy and the determined recognition accuracy of an object whose recognition accuracy is lower, the display controller 402 may perform the division-number setting and the dividing-method determination of the second graphic and the highlighted-region setting.

Modification 15

Only the second graphic (e.g., the graphic 302) may be displayed without displaying the first graphic (e.g., the graphic 301).

Second Embodiment

Figure 12:
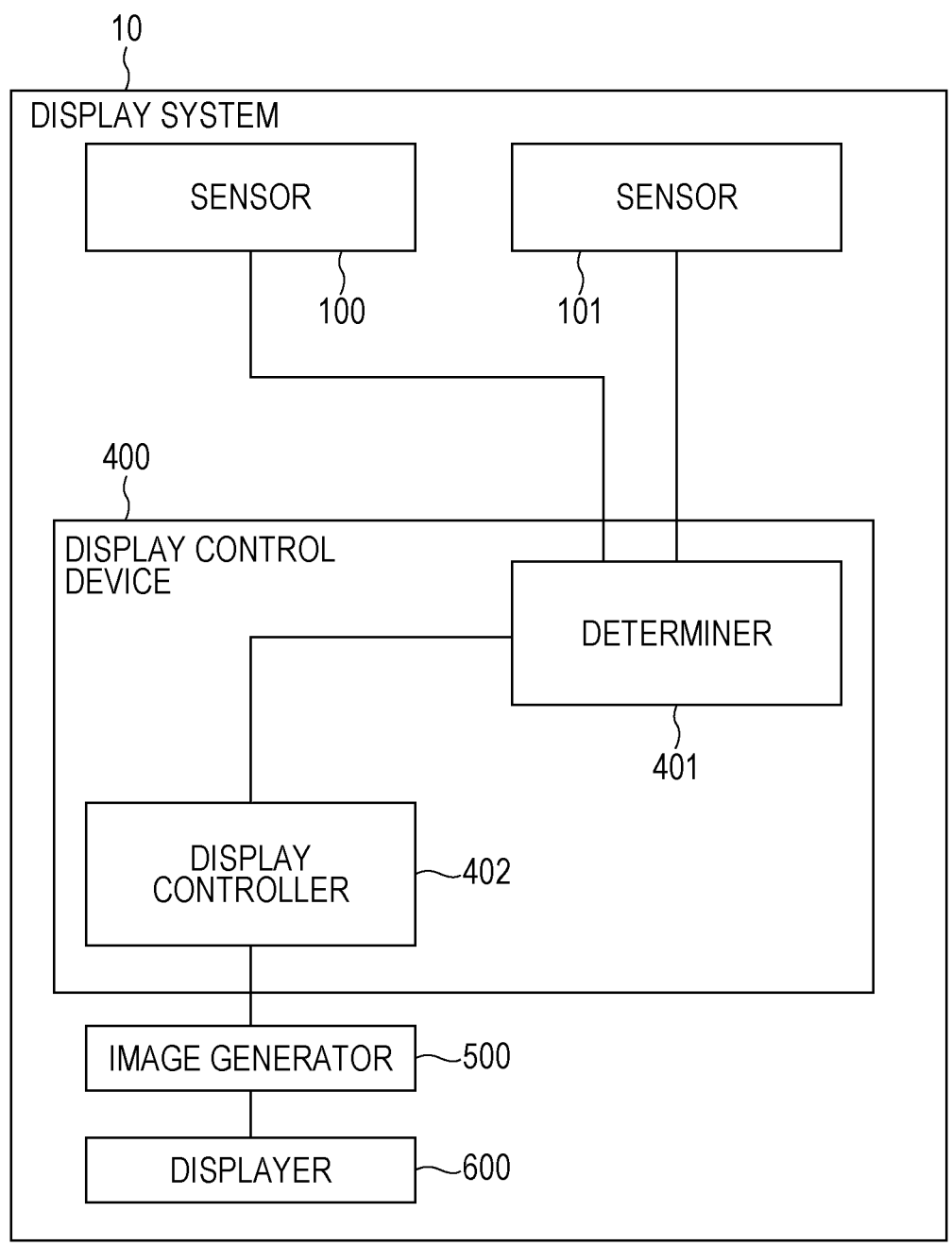
FIG. 12 is a block diagram illustrating an example configuration of a display system according to a second embodiment of the present disclosure.

A second embodiment of the present disclosure will be described with reference to FIG. 12. FIG. 12 is a block diagram illustrating an example configuration of the display system 10 according to the present embodiment. FIG. 12 is different from FIG. 1 in that the display system 10 further has a sensor 101 and does not have the recognizer 200 and the calculator 300. Since constituent elements in FIG. 12 are the same as or similar to those described with reference to FIG. 1, detailed descriptions thereof are not given hereinafter.

The sensor 100 is, for example, a sensing camera. The sensor 100 detects the surroundings of a vehicle and outputs a result of the detection to the determiner 401.

The sensor 101 is, for example, a raindrop sensor or an illuminance sensor and can detect a driving environment in which the recognition accuracy is likely to decrease (e.g., whether or not the vehicle is traveling in bad weather, such as in rain, fog, sleet, hail, or snow, whether or not the illuminance in the surroundings of the vehicle is increased due to backlight, the headlights of an oncoming vehicle, or the like, or whether or not the illuminance in the surroundings of the vehicle is reduced due to traveling at night or in a tunnel). The sensor 101 detects bad weather due to rain, fog, or snow or an illuminance change due to backlight, illumination light from another vehicle, traveling at night, or traveling in a tunnel and outputs a result of the detection to the determiner 401.

When the sensor 101 does not detect bad weather or an illuminance change, the determiner 401 determines that the recognition accuracy of the sensor 100 is a first recognition accuracy. Also, when the sensor 101 detects bad weather or an illuminance change, the determiner 401 determines that the recognition accuracy of the sensor 100 is a second recognition accuracy lower than the first recognition accuracy.

When the determiner 401 determines that the recognition accuracy of the sensor 100 is the first recognition accuracy, the display controller 402 controls the image generator 500 so as to generate a predetermined image that shows a graphic having a predetermined shape, divided into n regions (n is an integer greater than or equal to 2), and indicating a positional relationship between the predetermined object and the vehicle, when displayed on a display medium. Also, when the determiner 401 determines that the recognition accuracy of the sensor 100 is the second recognition accuracy, the display controller 402 controls the image generator 500 so as to generate a predetermined image that shows a graphic having a predetermined shape and undivided or divided into m regions (m is an integer that is greater than or equal to 1 and that is smaller than n) when displayed on a display medium.

As described above, the present embodiment can offer substantially the same advantages as those in the first embodiment described above. The modifications described in the first embodiment may also be applied to the present embodiment, as appropriate.

Third Embodiment

A third embodiment of the present disclosure will be described with reference to the accompanying drawings.

When the division number of the graphic is changed according to the recognition accuracy, if the deletion of a second graphic being displayed and the display of a next second graphic to be displayed are simultaneously performed, large changes occur in the image instantaneously, and thus the driver experiences annoyance. Accordingly, in the present embodiment, when the division number of the graphic is changed according to the recognition accuracy, control is performed so that deletion of a second graphic being displayed and the display of a next second graphic to be displayed are changed in a time series.

Figure 13:
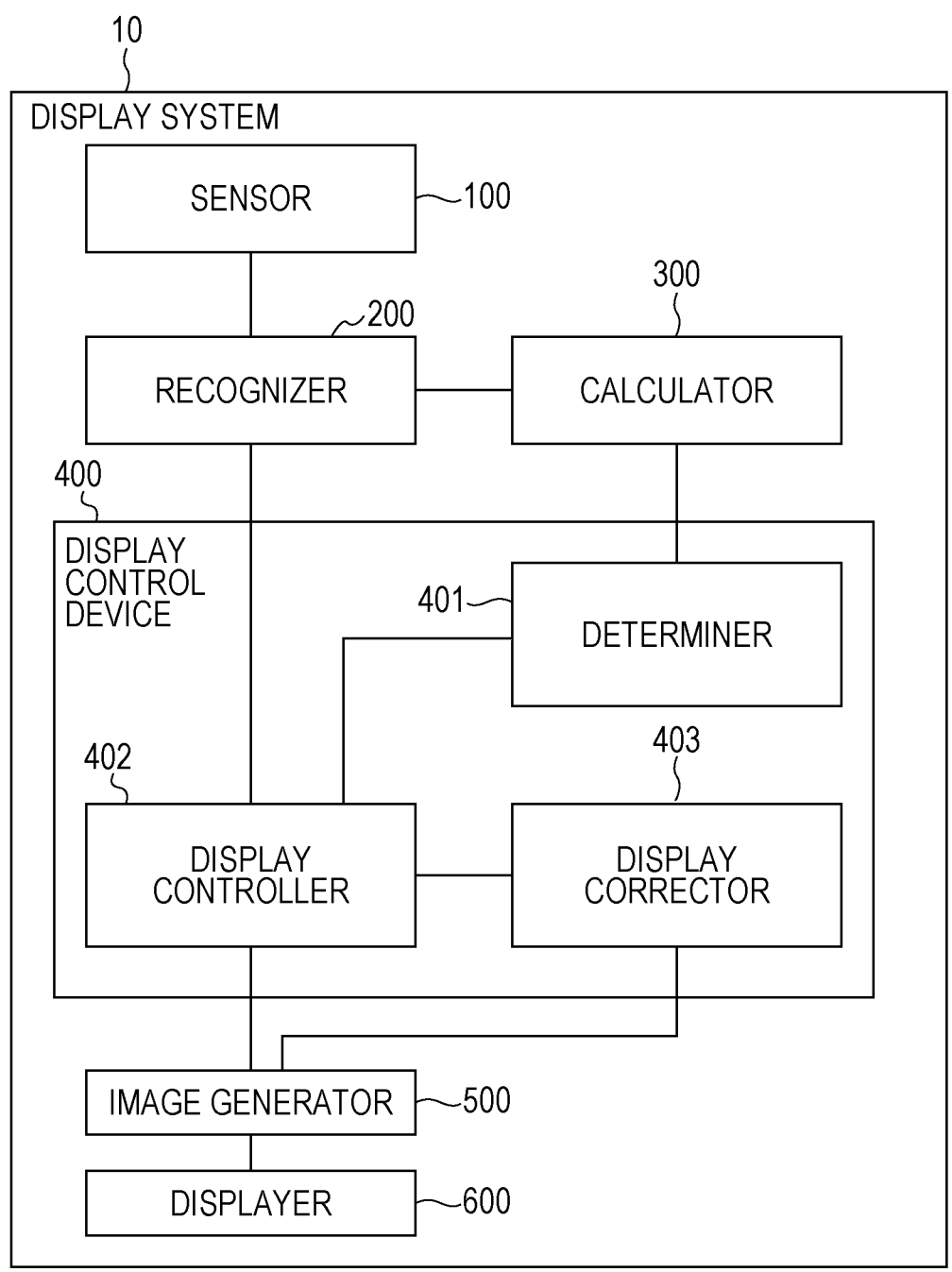
FIG. 13 is a block diagram illustrating an example configuration of a display system according to a third embodiment of the present disclosure.

First, a description will be given of an example configuration of a display system 10 according to the present embodiment. FIG. 13 is a block diagram illustrating an example configuration of the display system 10 according to the present embodiment. FIG. 13 is different from FIG. 1 in that the display control device 400 further has a display corrector 403. In FIG. 13, constituent elements that are the same as or similar to those in FIG. 1 are denoted by the same reference numerals, and descriptions thereof are not given hereinafter.

When there is a change between the division number of the second graphic being displayed (hereinafter referred to as a "graphic being displayed") and the division number of a next second graphic to be displayed (hereinafter referred to as a "latest graphic"), the display corrector 403 corrects the control information from the display controller 402 and outputs the corrected control information to the image generator 500. The corrected control information includes information for causing the image generator 500 to execute control for causing the deletion of the graphic being displayed and the display of the latest graphic to be changed in a time series. A detailed operation of the display corrector 403 is described later with reference to FIG. 14.

Figure 14:
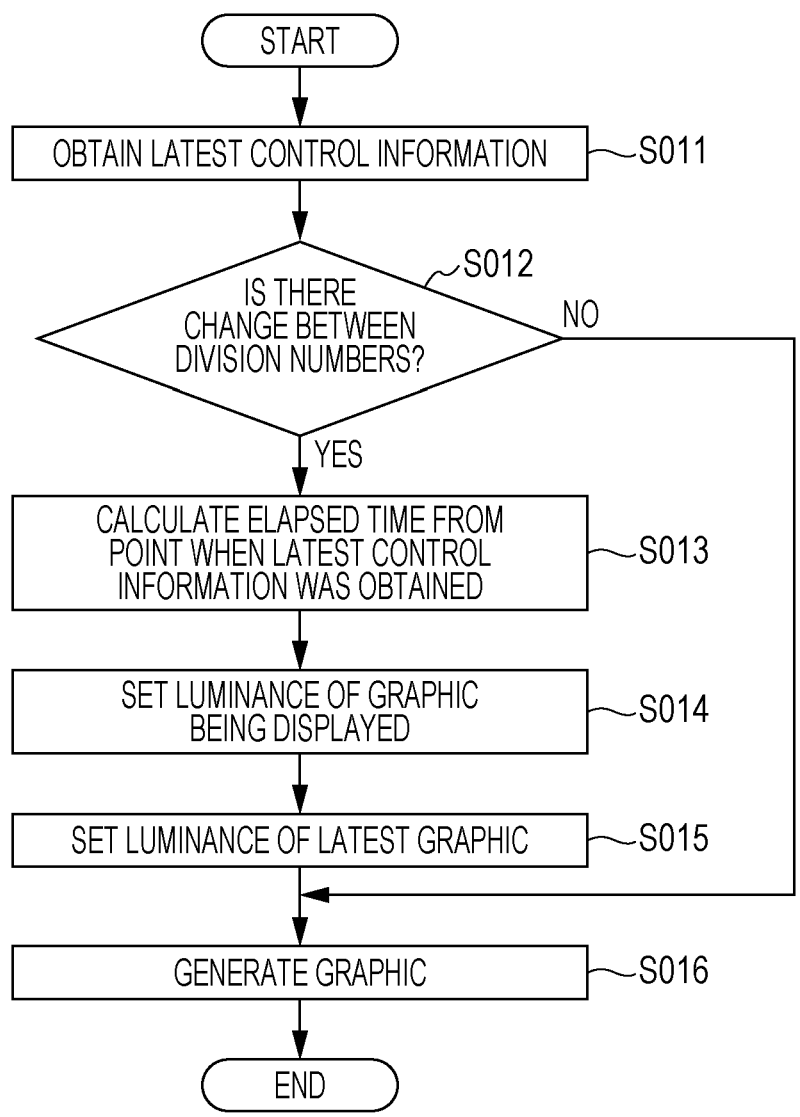
FIG. 14 is a flowchart illustrating an example operation of the display system according to third embodiment of the present disclosure.

Next, a description will be given of an example operation of the display system 10 according to the present embodiment. FIG. 14 is a flowchart illustrating an example operation of the display system 10 according to the present embodiment.

In step S011, the display corrector 403 obtains the latest control information from the display controller 402. This control information includes, for example, the shape of the latest graphic, the division number, the dividing method, and the highlighted region.

In step S012, the display corrector 403 compares the division number included in the control information for the graphic being displayed with the division number included in the latest control information to determine whether or not there is a change between the division numbers. It is assumed that the control information for the graphic being displayed is stored by the display corrector 403 before it obtains the latest control information.

When the result of the determination processing in step S012 indicates that there is no change between the division numbers (NO in step S012), the display corrector 403 does not correct the latest control information, outputs the latest control information to the image generator 500, and newly stores the latest control information. Thereafter, the flow proceeds to step S016.

On the other hand, when the result of the determination processing in step S012 indicates that there is a change between the division numbers (YES in step S012), the flow proceeds to step S013.

In step S013, the display corrector 403 calculates a time that has elapsed from the time when the latest control information was obtained (this time is hereinafter referred to simply as "elapsed time").

Figure 15A:
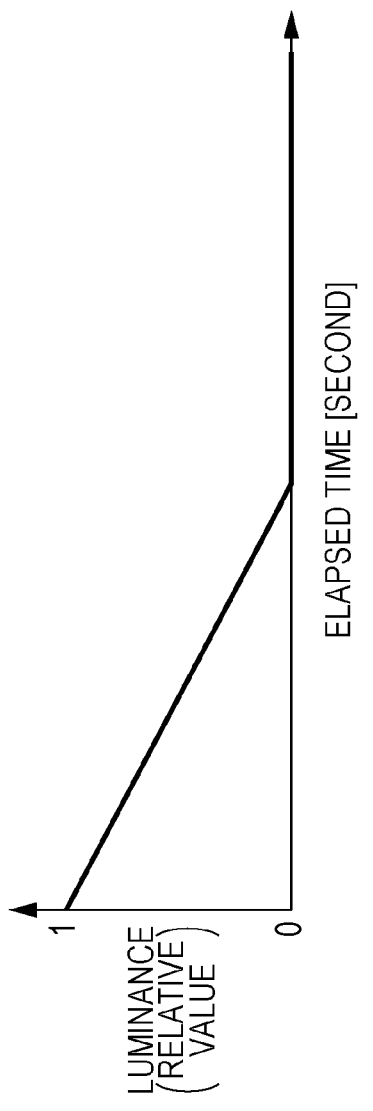
FIGS. 15A to 15C illustrate examples of a luminance setting pattern and an image transition according to the third embodiment of the present disclosure.

In step S014, in accordance with the elapsed time, the display corrector 403 sets a luminance of the graphic being displayed. FIG. 15A illustrates a specific example of this setting. As illustrated in FIG. 15A, the display corrector 403 performs setting so that the luminance (relative value) of the graphic being displayed decreases gradually in accordance with the elapsed time.

Figure 15B:
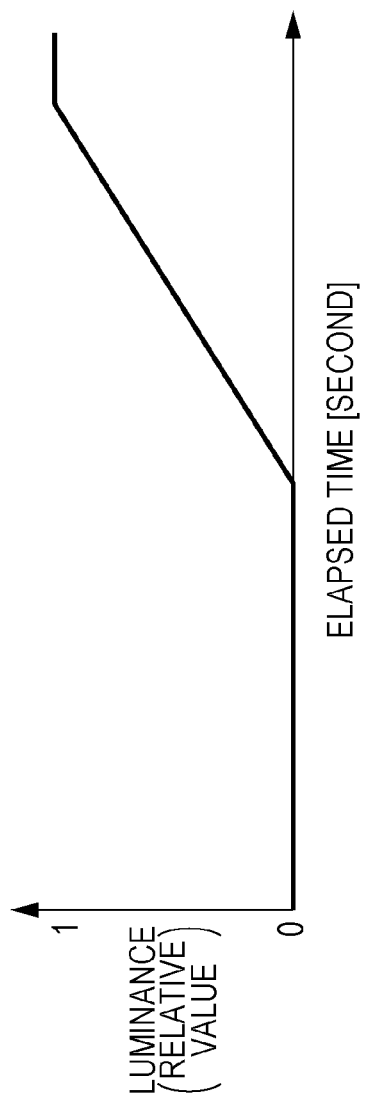

In step S015, the display corrector 403 sets a luminance of the latest graphic in accordance with the elapsed time. FIG. 15B illustrates a specific example of this setting. As illustrated in FIG. 15B, the display corrector 403 performs setting so that the luminance (relative value) of the latest graphic increases gradually in accordance with the elapsed time.

After setting the luminance, the display corrector 403 outputs information including the control information for the graphic being displayed, the latest control information, the luminance set in step S014, and the luminance set in step S015 to the image generator 500 as the corrected control information. Also, the display corrector 403 newly stores the latest control information.

Figure 15C:
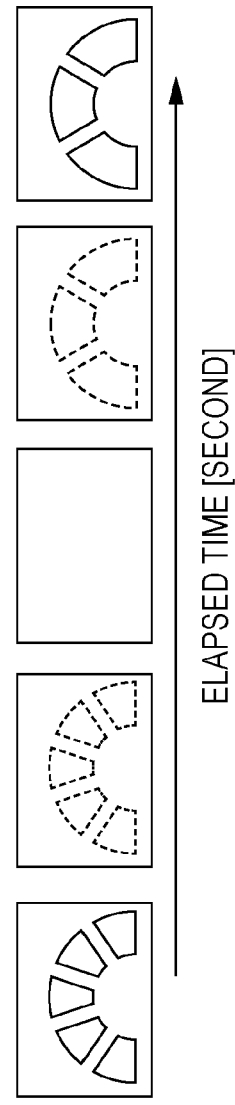

In step S016, on the basis of the control information from the display corrector 403, the displayer 600 generates a graphic and displays the graphic on the display. For example, when the result of the determination processing in step S012 indicates that there is no change between the division numbers, a graphic is generated and displayed based on the un-corrected latest control information. On the other hand, when the result of the determination processing in step S012 indicates that there is a change between the division numbers, a graphic is generated and displayed based on the corrected control information. A specific example of this case is illustrated in FIG. 15C. For example, when the recognition accuracy decreases during display of the graphic illustrated in FIG. 7D (one example of the graphic being displayed), and the graphic being displayed is switched to the graphic illustrated in FIG. 7B (one example of the latest graphic), display is performed so that the luminance of the graphic in FIG. 7D decreases gradually, and the luminance of the graphic in FIG. 7B increases gradually, in accordance with the elapsed time, as illustrated in FIG. 15C.

As described above, the present embodiment has the feature that control for causing the deletion of the graphic being displayed and the display of the latest graphic to be changed in a time series is performed when the division number of the graphic is changed according to the recognition accuracy. With this arrangement, the graphic is seen such that the graphic being displayed disappears gradually and the latest graphic appears gradually, thus making it possible to reduce the annoyance experienced by the driver.

Although the third embodiment of the present disclosure has been described above, the present disclosure is not limited to the third embodiment described above, and various changes and modifications can be made thereto. For example, each modification described above in the first embodiment and/or the second embodiment may also be applied to the third embodiment, as appropriate.

The functions of the individual constituent elements in the display system 10 and the display control device 400 in each embodiment described above can also be implemented by a computer program.

Figure 16:
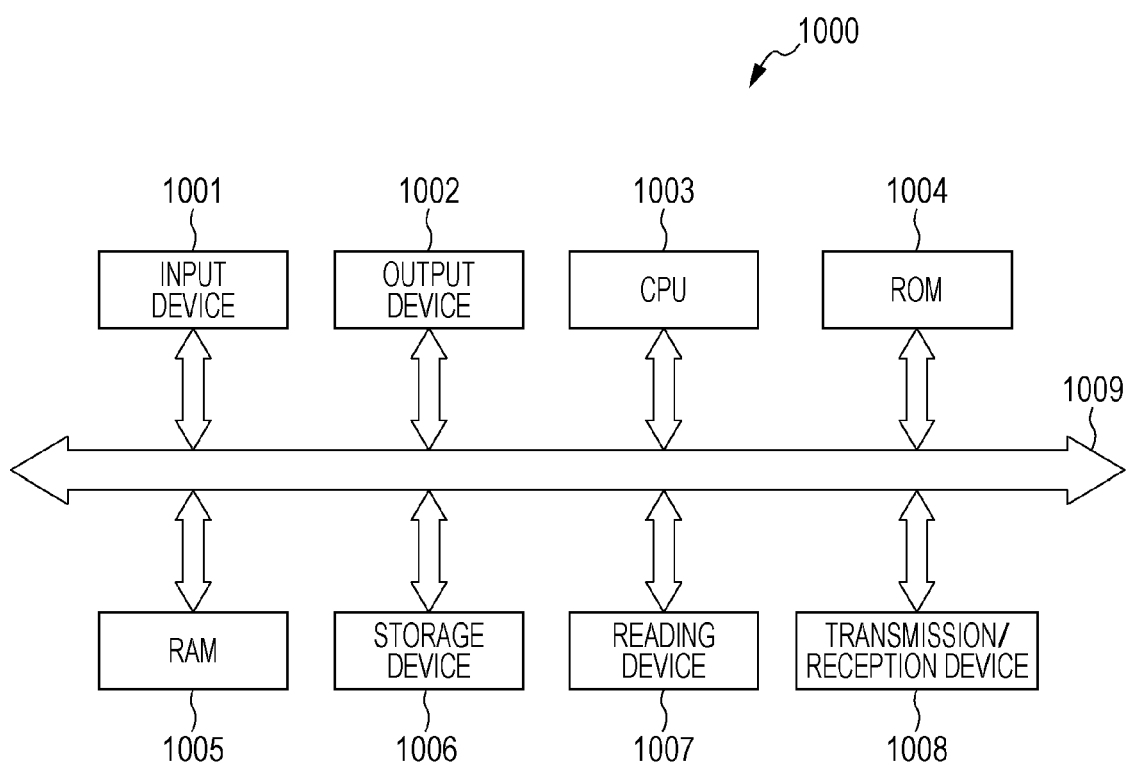
FIG. 16 is a block diagram illustrating a hardware example configuration of the display control systems and display control devices according to the first to third embodiments of the present disclosure.

FIG. 16 is a block diagram illustrating a hardware configuration of a computer that realizes the functions of the individual constituent elements by using a program. This computer 1000 includes an input device 1001, such as an input button and/or a touch pad, an output device 1002, such as a display or a speaker, a central processing unit (CPU) 1003, a read only memory (ROM) 1004, a random access memory (RAM) 1005, a storage device 1006, such as a hard-disk device or a solid-state drive (SSD), a reading device 1007 for reading information from a storage medium, such as a digital versatile disk read-only memory (DVD-ROM) or a Universal Serial Bus (USB) memory, and a transmission/reception device 1008 for performing communication over a network. These elements are connected through a bus 1009.

The reading device 1007 reads a program for realizing the functions of the constituent elements described above from a storage medium on which the program is recorded, and the read program is stored in the storage device 1006. Alternatively, the transmission/reception device 1008 communicates with a server apparatus connected to the network, downloads, from the server apparatus, a program for realizing the functions of the constituent elements described above, and stores the downloaded program in the storage device 1006.

The CPU 1003 copies the program stored in the storage device 1006 to the RAM 1005, sequentially reads instructions included in the program from the RAM 1005, and executes the instructions to thereby realize the functions of the constituent elements described above. Also, during execution of the program, information resulting from the various processes described above in each embodiment is stored in the RAM 1005 or the storage device 1006 and is used, as appropriate.

The present disclosure is useful for a display control device and a display control program that control display of information provided to a user (e.g., an occupant in a vehicle or the like or a user wearing a display device).

The functional blocks used in the description of the above embodiments may be realized in the form of a large scale integration (LSI), which is an integrated circuit. The functional blocks may be individually integrated into single chips or at least one or all of the functional blocks may be integrated into a single chip. Although the functional blocks are implemented in the form of an LSI in this case, they may also be called an integrated circuit (IC), a system LSI, a super LSI, or an ultra LSI depending on the difference in the degree of integration.

The scheme for integrating the functional blocks into an integrated circuit is not limited to a scheme for LSI and may be realized with a dedicated circuit or a general-purpose processor. The functional blocks can also be implemented using a field programmable gate array (FPGA) that can be programmed after manufacture of an LSI or a reconfigurable processor that allows reconfiguration of connections and settings of circuit cells in an LSI.

In addition, when a technology for circuit integration that replaces LSI becomes available with the advancement of semiconductor technology or another derivative technology, such a technology may also naturally be used to integrate the functional blocks. For example, biotechnology is applicable to the integration.

What is claimed is:

1. A display control device in a display system including a detection device that detects a predetermined object that exists in surroundings of a movable body, a calculator that calculates a detection accuracy of the detection device, an image generator that generates a predetermined image, and a displayer that outputs the predetermined image on a display medium to display a graphic having a predetermined shape on the display medium, the display control device comprising:
   an obtainer that obtains the detection accuracy; and
   a controller that controls, based on the detection accuracy, the image generator so as to generate the predetermined image that shows the graphic having a predetermined shape when displayed on the display medium, wherein the controller:
controls the image generator so as to generate a first predetermined image as the predetermined image, when the obtainer obtains a first detection accuracy, and
controls the image generator so as to generate a second predetermined image as the predetermined image, when the obtainer obtains a second detection accuracy lower than the first detection accuracy,
wherein the first predetermined image shows, as the graphic having a predetermined shape, a first graphic divided into n regions when displayed on the display medium, the first graphic including a divided region, and the second predetermined image shows, as the graphic having a predetermined shape, a second graphic divided into m regions or undivided when displayed on the display medium, the second graphic including a divided region or an undivided region, and
n is an integer greater than or equal to 2, and m is an integer that is greater than or equal to 1 and that is smaller than n.

2. The display control device according to claim 1,
wherein the display medium is a windshield of the movable body; and
the displayer displays the graphic having a predetermined shape on the windshield by projecting the predetermined image onto the windshield.

3. The display control device according to claim 1,
wherein the display medium is a transmissive display, and the predetermined image is image data; and
the displayer displays the graphic having a predetermined shape on the transmissive display by outputting the image data onto the transmissive display.

4. The display control device according to claim 1,
wherein each of the first predetermined image and the second predetermined image includes a highlighted region indicating a positional relationship between the movable body and the predetermined object.

5. The display control device according to claim 4,
wherein the graphic having a predetermined shape is a graphic divided into a plurality of regions by one or more lines extending radially from a predetermined reference point; and
the plurality of regions include a first region indicating a direction in which the predetermined object exists relative to the movable body and one or more second regions other than the first region, the first region being displayed in a first display mode, and the one or more second regions being displayed in a second display mode different from the first display mode.

6. The display control device according to claim 4,
wherein, in the case where the graphic having a predetermined shape is displayed without being divided,
the controller
controls the image generator so as to generate the predetermined image that shows the predetermined shape in a first mode, when the detection device recognizes the predetermined object, and
controls the image generator so as to generate the predetermined image that shows the predetermined shape in a second mode when the detection device does not recognize the predetermined object.

7. The display control device according to claim 5,
wherein, in the case where a division number of the graphic having a predetermined shape and displayed on the display medium changes owing to a change in the detection accuracy,
the controller
controls the image generator so that, when the first region in the graphic having a predetermined shape increases owing to a decrease in the division number, luminance of the first region decreases compared with the luminance thereof before the decrease in the division number, and
controls the image generator so that, when the first region in the graphic having a predetermined shape decreases owing to an increase in the division number, the luminance of the first region increases compared with the luminance thereof before the increase in the division number.

8. The display control device according to claim 1,
wherein the graphic having a predetermined shape includes a region indicating a distance between the predetermined object and the movable body.

9. The display control device according to claim 8,
wherein the graphic having a predetermined shape is a graphic divided into a plurality of regions by one or more lines that extend in a horizontal direction or one or more lines that extend in an arc direction of a circle having a center at a predetermined reference point; and
the plurality of regions include a third region indicating a distance between the movable body and the predetermined object and one or more fourth regions other than the third region, the third region being displayed in a first display mode, and the one or more fourth regions being displayed in a second display mode different from the first display mode.

10. The display control device according to claim 8,
wherein, when the graphic having a predetermined shape is displayed without being divided,
the controller
controls the image generator so as to generate the predetermined image that shows the predetermined shape in a first mode, when the detection device recognizes the predetermined object, and
controls the image generator so as to generate the predetermined image that shows the predetermined shape in a second mode when the detection device does not recognize the predetermined object.

11. The display control device according to claim 9,
wherein, in the case where a division number of the graphic having a predetermined shape and displayed on the display medium changes owing to a change in the detection accuracy,
the controller
controls the image generator so that, when the third region in the graphic having a predetermined shape increases owing to a decrease in the division number, luminance of the third region decreases compared with the luminance thereof before the decrease in the division number, and
controls the image generator so that, when the third region in the graphic having a predetermined shape decreases owing to an increase in the division number, the luminance of the third region increases compared with the luminance thereof before the increase in the division number.

12. The display control device according to claim 1,
wherein, in the case where a division number of the graphic having a predetermined shape and displayed on the display medium changes owing to a change in the detection accuracy,
the controller controls the image generator so as to display the graphic having a predetermined shape by causing a mode of the graphic before the change in the division number and a mode of the graphic after the change in the division number to be changed in a time series.

13. The display control device according to claim 1,
wherein the detection device comprises a first sensor that detects the surroundings of the movable body and a second sensor that detects predetermined weather or an illuminance change;
the detection accuracy is an accuracy of the first sensor;
when the second sensor does not detect the predetermined weather or the illuminance change, the first detection accuracy is used as the detection accuracy; and
when the second sensor detects the predetermined weather or the illuminance change, the second detection accuracy is used as the detection accuracy.

14. A display device, comprising:
an obtainer that obtains a detection accuracy of a detection device that detects a predetermined object that exists in surroundings of a movable body;
a controller that performs, based on the detection accuracy, control so as to generate a predetermined image that shows a graphic having a predetermined shape when displayed on a display medium;
an image generator that generates the predetermined image, based on control performed by the controller; and
a displayer that displays the graphic having a predetermined shape on the display medium by outputting the generated predetermined image onto the display medium,
wherein the controller:
controls the image generator so as to generate a first predetermined image as the predetermined image, when the obtainer obtains a first detection accuracy, and
controls the image generator so as to generate a second predetermined image as the predetermined image, when the obtainer obtains a second detection accuracy lower than the first detection accuracy, and
wherein the first predetermined image shows, as the graphic having a predetermined shape, a first graphic divided into n regions when displayed on the display medium, the first graphic including a divided region, and the second predetermined image shows, as the graphic having a predetermined shape, a second graphic divided into m regions or undivided when displayed on the display medium, the second graphic including a divided region or an undivided region, and
n is an integer greater than or equal to 2, and m is an integer that is greater than or equal to 1 and that is smaller than n.

15. The display device according to claim 14,
wherein the display medium is a windshield of the movable body; and
the displayer displays the graphic having a predetermined shape on the windshield by projecting the predetermined image onto the windshield.

16. The display device according to claim 14,
wherein the display medium is a transmissive display, and the predetermined image is image data; and
the displayer displays the graphic having a predetermined shape on the transmissive display by outputting the image data onto the transmissive display.

17. A display device according to claim 14, further comprising:
a display medium; the controller that performs, based on the detection accuracy, control so as to generate a predetermined image that shows a graphic having a predetermined shape when displayed on the display medium; and
the displayer that displays the graphic having a predetermined shape on the display medium by outputting the generated predetermined image onto the display medium.

18. A method of controlling a display system including a detection device that detects a predetermined object that exists in surroundings of a movable body, a calculator that calculates a detection accuracy of the detection device, an image generator that generates a predetermined image, and a displayer that outputs the predetermined image on a display medium to display a graphic having a predetermined shape on the display medium, the method comprising:
controlling the image generator so as to generate a first predetermined image as the predetermined image, when the detection accuracy calculated by the calculator is a first detection accuracy;
controlling the image generator so as to generate a second predetermined image as the predetermined image, when the calculated detection accuracy changes from the first detection accuracy to a second detection accuracy lower than the first detection accuracy,
wherein the first predetermined image shows, as the graphic having a predetermined shape, a first graphic divided into n regions when displayed on the display medium, the first graphic including a divided region, and the second predetermined image shows, as the graphic having a predetermined shape, a second graphic divided into m regions or undivided when displayed on the display medium, the second graphic including a divided region or an undivided region, and
n is an integer greater than or equal to 2, and m is an integer that is greater than or equal to 1 and that is smaller than n.

19. A non-transitory computer-readable storage medium storing a program for causing a computer to execute the display control method according to claim 18.

20. The display control device according to claim 4,
wherein the highlighted region is the divided region.

* * * * *